(12) United States Patent
Jia

(10) Patent No.: US 11,226,471 B2
(45) Date of Patent: Jan. 18, 2022

(54) CAMERA LENS ASSEMBLY

(71) Applicant: ZHEJIANG SUNNY OPTICAL CO., LTD., Ningbo (CN)

(72) Inventor: Yuanlin Jia, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 154 days.

(21) Appl. No.: 16/231,114

(22) Filed: Dec. 21, 2018

(65) Prior Publication Data

US 2019/0121101 A1 Apr. 25, 2019

Related U.S. Application Data

(63) Continuation of application No. PCT/CN2018/080109, filed on Mar. 23, 2018.

(30) Foreign Application Priority Data

Aug. 15, 2017 (CN) .................... 201710695396.X
Aug. 15, 2017 (CN) .................... 201721016841.7

(51) Int. Cl.
  *G02B 13/00* (2006.01)
  *G02B 9/60* (2006.01)
  *G02B 13/06* (2006.01)

(52) U.S. Cl.
  CPC ........... *G02B 13/0045* (2013.01); *G02B 9/60* (2013.01); *G02B 13/06* (2013.01)

(58) Field of Classification Search
  CPC ...... G02B 13/0045; G02B 13/06; G02B 9/60; G02B 13/18

USPC ....... 359/642, 738, 739, 740, 763, 770, 756, 359/746
See application file for complete search history.

(56) References Cited

U.S. PATENT DOCUMENTS

| 7,697,220 B2 | 4/2010 | Iyama | |
| 2012/0229918 A1* | 9/2012 | Chen | G02B 13/0045 359/715 |
| 2017/0031133 A1* | 2/2017 | Liu | G02B 13/06 |
| 2017/0115470 A1* | 4/2017 | Liao | G02B 9/62 |
| 2018/0024322 A1* | 1/2018 | Chen | G02B 13/0045 359/713 |

(Continued)

FOREIGN PATENT DOCUMENTS

| CN | 102213816 A | 10/2011 |
| CN | 102338923 A | 2/2012 |
| CN | 103777322 A | 5/2014 |

(Continued)

*Primary Examiner* — Marin Pichler
*Assistant Examiner* — Alberto J Betancourt
(74) *Attorney, Agent, or Firm* — Hauptman Ham, LLP

(57) ABSTRACT

The present disclosure discloses a camera lens assembly. The camera lens assembly includes, sequentially along an optical axis from an object side to an image side, a first lens, a second lens, a third lens, a fourth lens, and a fifth lens. The first lens has a negative refractive power, and an image-side surface of the first lens is a concave surface. The second lens has a positive refractive power, and an image-side surface of the second lens is a convex surface. Each of the third lens, the fourth lens, and the fifth lens has a positive refractive power or a negative refractive power. A total effective focal length f of the camera lens assembly and an entrance pupil diameter EPD of the camera lens assembly satisfy: $0.8<f/EPD<1.6$.

19 Claims, 11 Drawing Sheets

(56) References Cited

U.S. PATENT DOCUMENTS

2018/0188495 A1* 7/2018 Chang ................ G02B 13/0045
2018/0341086 A1* 11/2018 Tseng ................ G02B 13/0045

FOREIGN PATENT DOCUMENTS

| CN | 103777323 A | 5/2014 |
| CN | 107272165 A | 10/2017 |
| CN | 207008164 U | 2/2018 |

* cited by examiner

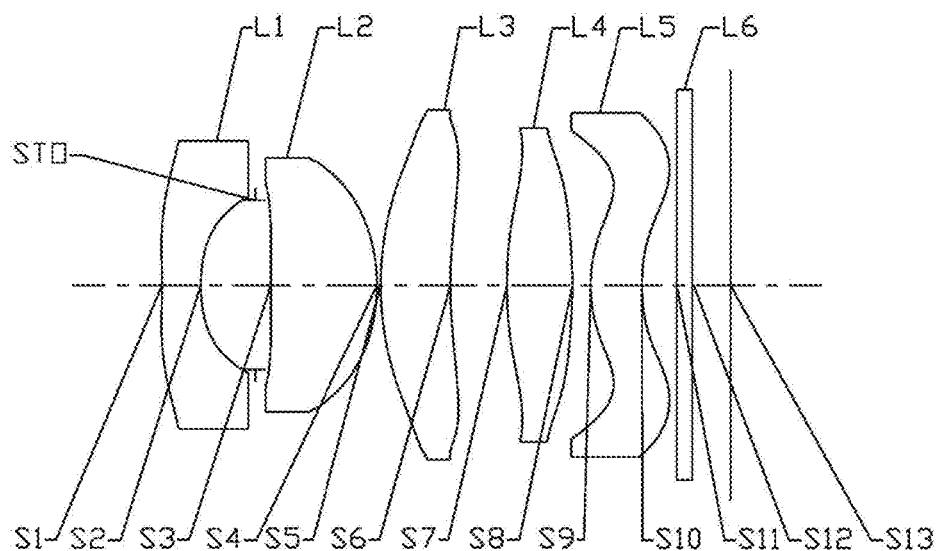
Fig. 13
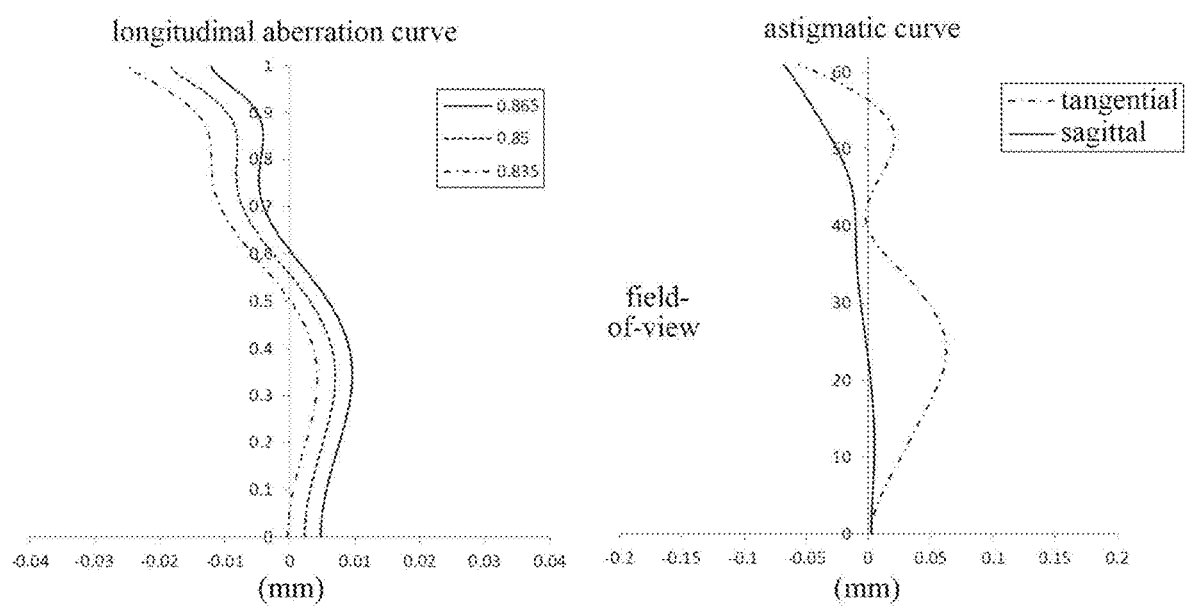
Fig. 14A
Fig. 14B

CAMERA LENS ASSEMBLY

CROSS-REFERENCE TO RELATED APPLICATIONS

This application a continuation of International Application No. PCT/CN2018/080109, filed on Mar. 23, 2018, which claims the priorities and rights to Chinese Patent Application No. 201710695396.X and Chinese Patent Application No. 201721016841.7 filed with the China National Intellectual Property Administration (CNIPA) on Aug. 15, 2017. All of the aforementioned applications are hereby incorporated by reference in their entireties.

TECHNICAL FIELD

The present disclosure relates to a camera lens assembly, and more specifically to a camera lens assembly including five lenses and having a large field-of-view and a large aperture.

BACKGROUND

At present, there are generally 3 technical solutions for the three-dimensional depth measurement, which are dual-camera, structured light, and TOF respectively. TOF is an abbreviation for the time of flight technology, which is to calculate the flight time of light. The TOF technology is widely used because of its advantages such as fast responding speed, high accuracy of depth information, small structural size and unsusceptible to environment lights.

With the development of science and technology, frontier areas such as VR/AR (virtual reality/augmented reality), robot, security, and autonomous driving are developing rapidly. In these fields, a camera lens assembly is generally required to acquire the depth information of a captured object therearound, the depth information including the three-dimensional position and the size information. Accordingly, requirements on the assorted camera lens assemblies are higher, and a three-dimensional depth camera capable of performing three-dimensional depth measurement is required.

The three-dimensional depth camera is generally a wide-angle lens assembly, which has characteristics of short focal length, large depth of field, etc. A relative short focal length helps to achieve a light and thin imaging device. A relative long depth of field helps to ensure that an object in certain depths before and behind a captured subject is clearly imaged. In addition, the three-dimensional depth camera further possesses characteristics of large field-of-view and large aperture. Under the same condition, the larger the field-of-view is, the larger the amount of information that can be obtained is. Large aperture can effectively increase the energy intensity of an image plane, thus improving the accuracy of measuring the depth.

At present, for common wide-angle lens assemblies, the total length thereof is long and the imaging quality thereof is mediocre. Accordingly, requirements of the three-dimensional depth camera cannot be well satisfied. Therefore, a camera lens assembly having a large aperature, a large field-of-view and a high imaging quality is needed.

SUMMARY

The present disclosure provides a camera lens assembly which may avoid at least one of the above disadvantages in the existing technology, for example, a camera lens assembly having a large field-of-view and a large aperture.

According to an aspect, the present disclosure provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. A total effective focal length f of the camera lens assembly and an entrance pupil diameter EPD of the camera lens assembly may satisfy: $0.8 < f/EPD < 1.6$.

In an implementation, an effective focal length f1 of the first lens and the total effective focal length f of the camera lens assembly may satisfy: $-2.1 < f1/f < -1.5$.

In an implementation, an effective focal length f2 of the second lens and the total effective focal length f of the camera lens assembly may satisfy: $1.4 < f2/f < 3$.

In an implementation, a combined refractive power of the second lens, the third lens, the fourth lens, and the fifth lens is a positive refractive power. A combined focal length f2345 of the second lens, the third lens, the fourth lens, and the fifth lens and the total effective focal length f of the camera lens assembly may satisfy: $0.8 < f2345/f < 1.3$.

In an implementation, an effective semi-diameter DT11 of an object-side surface of the first lens and the entrance pupil diameter EPD of the camera lens assembly may satisfy: $1 < DT11/EPD < 1.6$.

In an implementation, the effective semi-diameter DT11 of the object-side surface of the first lens and an effective semi-diameter DT52 of an image-side surface of the fifth lens may satisfy: $0.7 < DT11/DT52 < 1.3$.

In an implementation, a center thickness CT2 of the second lens along the optical axis and an edge thickness ET2 of the second lens may satisfy: $1.8 < CT2/ET2 < 3.5$.

In an implementation, a half HFOV of a maximal field-of-view of the camera lens assembly may satisfy: $\tan(HFOV/2) > 0.5$.

In an implementation, a sum $\Sigma T$ of respective axial spacing distances between respective pairs of two adjacent ones of the first lens to the fifth lens and an axial distance TTL from the object-side surface of the first lens to an image plane of the camera lens assembly may satisfy: $0.1 < \Sigma T/TTL \leq 0.3$.

In an implementation, the camera lens assembly may further include a diaphragm disposed between the first lens and the second lens.

In an implementation, an axial distance SL from the diaphragm to the image plane of the camera lens assembly and the axial distance TTL from the object-side surface of the first lens to the image plane of the camera lens assembly may satisfy: $0.7 < SL/TTL < 1$.

According to another aspect, the present disclosure further provides a camera lens assembly having a total effective focal length f. The camera lens assembly includes, sequentially along an optical axis from an object side to an image side, a first lens, a second lens, a third lens, a fourth lens, and a fifth lens. The first lens may have a negative refractive power. At least one of the second lens, the third lens, the fourth lens, or the fifth lens may have a positive refractive power. An effective focal length f1 of the first lens and the total effective focal length f of the camera lens assembly may satisfy: $-2.1 < f1/f < -1.5$. A combined refractive power of the second lens, the third lens, the fourth lens, and the fifth lens may be a positive refractive power.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and at least one of an object-side surface of the first lens or an image-side surface of the first lens may be a concave surface. The second lens may have a positive refractive power, and at least one of an object-side surface of the second lens or an image-side surface of the second lens may be a convex surface. Each of the third lens, the fourth lens, and the fifth lens may have a positive refractive power or a negative refractive power. An effective semi-diameter DT11 of the object-side surface of the first lens and an entrance pupil diameter EPD of the camera lens assembly may satisfy: $1<DT11/EPD<1.6$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. A half HFOV of a maximal field-of-view of the camera lens assembly may satisfy: $\tan(HFOV/2)>0.5$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. A combined focal length f2345 of the second lens, the third lens, the fourth lens, and the fifth lens and a total effective focal length f of the camera lens assembly may satisfy: $0.8<f2345/f<1.3$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. An effective focal length f2 of the second lens and a total effective focal length f of the camera lens assembly may satisfy: $1.4<f2/f<3$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. A sum $\Sigma T$ of respective axial spacing distances between respective pairs of two adjacent ones of the first lens to the fifth lens and an axial distance TTL from an object-side surface of the first lens to an image plane of the camera lens assembly may satisfy: $0.1<\Sigma T/TTL\leq 0.3$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. A center thickness CT2 of the second lens along the optical axis and an edge thickness ET2 of the second lens may satisfy: $1.8<CT2/ET2<3.5$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. An effective semi-diameter DT11 of an object-side surface of the first lens and an effective semi-diameter DT52 of an image-side surface of the fifth lens may satisfy: $0.7<DT11/DT52<1.3$.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a negative refractive power, and an image-side surface of the first lens may be a concave surface. The second lens may have a positive refractive power, and an image-side surface of the second lens may be a convex surface. Each of the third lens, the fourth lens, and the fifth lens may have a positive refractive power or a negative refractive power. The camera lens assembly may further include a diaphragm disposed between the first lens and the second lens. An axial distance SL from the diaphragm to an image plane of the camera lens assembly and an axial distance TTL from an object-side surface of the first lens to the image plane of the camera lens assembly may satisfy: $0.7<SL/TTL<1$.

The camera lens assembly provided by the present disclosure can better achieve characteristics such as large field-of-view and large aperature while ensuring the imaging quality.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIG. 13 is a schematic structural diagram illustrating a camera lens assembly according to a seventh embodiment of the present disclosure; and FIGS. 14A-14D respectively illustrate a longitudinal aberration curve, an astigmatic curve, a distortion curve, and a lateral color curve of the camera lens assembly according to the seventh embodiment.

DETAILED DESCRIPTION

Figure 1:
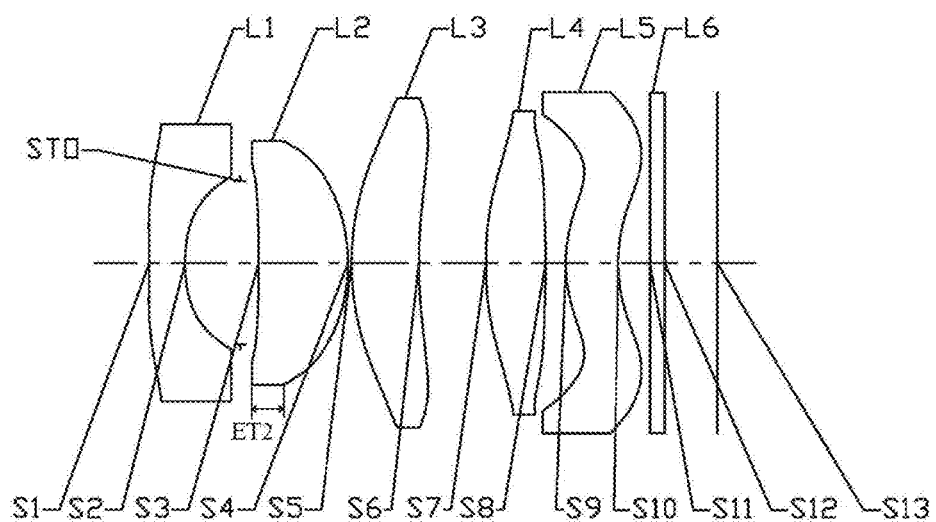
FIG. 1 is a schematic structural diagram illustrating a camera lens assembly according to a first embodiment of the present disclosure.

For better understanding the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any one and all combinations of one or more of the associated listed items.

It should be noted that in the specification, the expressions such as "first," "second" and "third" are only used to distinguish one feature from another, rather than represent any limitations to the features. Thus, the first lens discussed below may alternatively be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces are shown in the accompanying drawings as examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens has a convex surface and a position of the convex surface is not defined, at least the portion of the surface of the lens in the paraxial area is the convex surface; and if the surface of the lens has a concave surface and a position of the concave surface is not defined, at least the portion of the surface of the lens in the paraxial area is the concave surface. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The camera lens assembly according to exemplary implementations of the present disclosure includes, for example, five lenses (i.e., a first lens, a second lens, a third lens, a fourth lens, and a fifth lens) having refractive powers. The five lenses are arranged in sequence along an optical axis from an object side to an image side.

The camera lens assembly according to the exemplary implementations of the present disclosure may further include a photosensitive element disposed on an image plane. Alternatively, the photosensitive element disposed on the image plane may be a photosensitive charge-coupled device (CCD) or complementary metal-oxide semiconductor (CMOS) element.

The first lens may have a negative refractive power, and an image-side surface of the first lens may be a concave surface. The second lens may have a positive refractive power, and an image-side surface of the second lens may be a convex surface. The third lens has a positive refractive power or a negative refractive power. The fourth lens has a positive refractive power or a negative refractive power. The fifth lens has a positive refractive power or a negative refractive power.

Alternatively, the third lens may be a meniscus lens, and a radius R5 of curvature of an object-side surface of the third lens and a radius R6 of curvature of an image-side surface of the third lens may both be positive or negative. When R5 and R6 are both positive values, the object-side surface of the third lens is a convex surface, the image-side surface of the third lens is a concave surface, and the third lens is a meniscus lens convex toward the object side. When R5 and R6 are both negative values, the object-side surface of the third lens is a concave surface, the image-side surface of the third lens is a convex surface, and the third lens is a meniscus lens convex toward the image side.

Alternatively, the fifth lens may have a positive refractive power. An object-side surface of the fifth lens may have a portion being a convex surface at a paraxial position, and an image-side surface of the fifth lens may have a portion being a concave surface at a paraxial position.

An effective focal length f1 of the first lens and a total effective focal length f of the camera lens assembly may satisfy: $-2.1 < f1/f < -1.5$, and more specifically, f1 and f may further satisfy: $-2.07 \leq f1/f \leq -1.56$. The reasonable arrangement of the refractive power of the first lens is conductive to reducing the diameter of the lens on the basis of ensuring the processing technology, and correcting aberrations of the wide-angle lens assembly, thereby improving the imaging quality.

An effective focal length f2 of the second lens and the total effective focal length f of the camera lens assembly may satisfy: $1.4 < f2/f < 3$, and more specifically, f2 and f may further satisfy: $1.48 \leq f2/f \leq 2.82$. The second lens has a large positive refractive power, so that the second lens may have a large relative diameter, which is conductive to correcting the longitudinal aberration.

A combined focal length f2345 of the second lens, the third lens, the fourth lens, and the fifth lens and the total effective focal length f of the camera lens assembly may satisfy: $0.8 < f2345/f < 1.3$, and more specifically, f2345 and f may further satisfy: $0.97 \leq f2345/f \leq 1.17$. The refractive power of the first lens is negative, and the combined refractive power of the second lens, the third lens, the fourth lens, and the fifth lens is positive. After being diverged by the first lens, an off-axis ray passes through the second to fifth lenses at an obviously smaller angle, so that the second lens, the third lens, the fourth lens, and the fifth lens have a smaller view field, which is conductive to correcting the off-axis aberration of a subsequent component, and correspondingly, the first lens has a large view field.

The total effective focal length f of the camera lens assembly and an entrance pupil diameter EPD of the camera lens assembly may satisfy: $0.8 < f/EPD < 1.6$. For example, f and EPD may satisfy: $0.85 \leq f/EPD \leq 1.45$. As another example, f and EPD may satisfy: $0.90 \leq f/EPD \leq 1.30$, and more specifically, f and EPD may further satisfy: $1.00 \leq f/EPD \leq 1.20$. Satisfying the conditional expression $0.8 < f/EPD < 1.6$ may effectively improve the energy density of the image plane, which is conductive to improving the signal-to-noise ratio of the output signal of an image-side sensor (i.e., improving the accuracy of measuring the depth).

An effective semi-diameter DT11 of an object-side surface of the first lens and the entrance pupil diameter EPD of the camera lens assembly may satisfy: $1 < DT11/EPD < 1.6$, and more specifically, DT11 and EPD may further satisfy: $1.03 \leq DT11/EPD \leq 1.51$. When the conditional expression $1 < DT11/EPD < 1.6$ is satisfied, the effective diameter of the object-side surface of the first lens is close to the entrance pupil diameter of the camera lens assembly, which makes the diameter of the lens of the wide-angle lens assembly small, resulting in a low processing cost and a miniaturized lens assembly.

The effective semi-diameter DT11 of the object-side surface of the first lens and an effective semi-diameter DT52 of the image-side surface of the fifth lens may satisfy: $0.7 < DT11/DT52 < 1.3$, and more specifically, DT11 and DT52 may further satisfy: $0.81 \leq DT11/DT52 \leq 1.20$. The reasonable arrangement of DT11 and DT52 is conductive to reducing the diameters of the lenses, thereby achieving the miniaturization of the lens assembly, improving the assembling technology and reducing the costs.

A center thickness CT2 of the second lens along the optical axis and an edge thickness ET2 of the second lens may satisfy: $1.8 < CT2/ET2 < 3.5$, and more specifically, CT2 and ET2 may further satisfy: $1.90 \leq CT2/ET2 \leq 3.03$. Satisfying the conditional expression $1.8 < CT2/ET2 < 3.5$ may ensure the good processing technology for the second lens, and can effectively enhance the accuracy of processing the second lens to meet the requirement of high design tolerance, which is conductive to improving the imaging quality of the lens assembly.

A sum $\Sigma T$ of respective axial spacing distances between respective pairs of two adjacent ones of the lenses having refractive powers and a total track length TTL of the camera lens assembly (i.e., an axial distance from the center of the object-side surface of the first lens to the image plane of the camera lens assembly) may satisfy: $0.1 < \Sigma T/TTL \leq 0.3$, and more specifically, $\Sigma T$ and TTL may further satisfy: $0.16 \leq \Sigma T/TTL \leq 0.30$. In the camera lens assembly including five lenses having refractive powers, $\Sigma T = T12 + T23 + T34 + T45$. T12 is an axial spacing distance between the first lens and the second lens, and T23 is an axial spacing distance between the second lens and the third lens. T34 is an axial spacing distance between the third lens and the fourth lens, and T45 is an axial spacing distance between the fourth lens and the fifth lens. The reasonable configuration of $\Sigma T$ and TTL is conductive to shortening the total length of the camera lens assembly. In addition, reasonably increasing the axial spacing distances between the lenses is conductive to reducing the tolerance sensitivity of the system and improving the quality consistency of the mass-produced lens assemblies.

The camera lens assembly may further include at least one diaphragm as needed, to improve the imaging quality of the camera lens assembly. An axial distance SL from the diaphragm to the image plane of the camera lens assembly and the total track length TTL of the camera lens assembly may satisfy: $0.7 < SL/TTL < 1$, and more specifically, SL and TTL may further satisfy: $0.76 \leq SL/TTL \leq 0.85$. Alternatively, the diaphragm may be disposed between the first lens and the second lens. The diaphragm is disposed to be close to the first lens, which is conductive to reducing the diameter of the first lens, thereby reducing the costs for the lens assembly. In addition, when the first lens has a small diameter, the assembly of the camera lens assembly in one direction from front to back (in the direction from the first lens to the fifth lens) can be effectively achieved, which may improve the assembling technology.

A half HFOV of a maximal field-of-view of the camera lens assembly may satisfy: tan (HFOV/2)>0.5, and more specifically, HFOV may further satisfy: 0.54≤tan (HFOV/2)≤0.78. By reasonably distributing the refractive powers and restricting the field-of-view, the system obtains a large field-of-view under the premise of having the good imaging quality.

Alternatively, the camera lens assembly may further include an optical filter for correcting color deviations and/or a protective glass for protecting the photosensitive element on the image plane.

The camera lens assembly according to the above implementations of the present disclosure may use multiple lenses, for example, five lenses described above. By reasonably distributing the refractive powers and the surface types of the lenses, the center thicknesses of the lenses, the axial spacing distances between the lenses, etc., the sensitivity of the lens assembly may be effectively reduced, and the processability of the lens assembly may be effectively improved, so that the camera lens assembly is more conductive to the production and processing. In addition, the camera lens assembly may have beneficial effects such as large-aperture, large field-of-view, and high imaging quality.

In the implementations of the present disclosure, the object-side surface and image-side surface of each lens may both be aspheric surfaces. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

Furthermore, it should be understood by those skilled in the art that the various results and advantages described in the present specification may be obtained by changing the number of the lenses constituting the camera lens assembly without departing from the technical solution claimed by the present disclosure. For example, although the camera lens assembly having five lenses is described as an example in the implementations, the camera lens assembly is not limited to include five lenses. If desired, the camera lens assembly may also include other numbers of lenses.

Specific embodiments of the camera lens assembly that may be applied to the above implementations are further described below with reference to the accompanying drawings.

First Embodiment

A camera lens assembly according to a first embodiment of the present disclosure is described below with reference to FIGS. 1-2D. FIG. 1 is a schematic structural diagram illustrating the camera lens assembly according to the first embodiment of the present disclosure.

As shown in FIG. 1, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a concave surface, and an image-side surface S4 of the second lens L2 is a convex surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 1 shows the surface type, the radius of curvature, the thickness, the material and the conic coefficient of each lens of the camera lens assembly in the first embodiment. The units of the radius of curvature and the thickness are both millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | aspheric | −10.6202 | 0.5024 | 1.53 | 55.8 | 0.0000 |
| S2 | aspheric | 2.5167 | 0.7758 | | | 0.0000 |
| STO | spherical | infinite | 0.2577 | | | |
| S3 | aspheric | −24.3673 | 1.2646 | 1.62 | 23.5 | 0.0000 |
| S4 | aspheric | −2.5160 | 0.0500 | | | 0.0000 |
| S5 | aspheric | 3.6715 | 0.9457 | 1.53 | 55.8 | 0.0000 |
| S6 | aspheric | 6.4039 | 0.9433 | | | 0.0000 |
| S7 | aspheric | 6.0254 | 0.8399 | 1.62 | 23.5 | 0.0000 |
| S8 | aspheric | −8.2119 | 0.2845 | | | 0.0000 |
| S9 | aspheric | 2.3221 | 0.7454 | 1.53 | 55.8 | 0.0000 |
| S10 | aspheric | 2.5205 | 0.4440 | | | 0.0000 |
| S11 | spherical | infinite | 0.2100 | 1.52 | 64.2 | |
| S12 | spherical | infinite | 0.7367 | | | |
| S13 | spherical | infinite | | | | |

In this embodiment, each of the lenses may be an aspheric lens, and the surface type x of each aspheric surface is defined by the following formula:

$$x = \frac{ch^2}{1+\sqrt{1-(k+1)c^2h^2}} + \sum A_i h^i. \quad (1)$$

Here, x is the sag of the displacement of the aspheric surface from the vertex of the aspheric surface, when the surface is at distance h from the optical axis; c is the paraxial curvature of the aspheric surface, and c=1/R (i.e., the paraxial curvature c is the reciprocal of the radius R of curvature in Table 1 above); k is the conic coefficient (given in Table 1 above); and Ai is the the $i^{th}$ order correction coefficient of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S10 in the first embodiment.

TABLE 2

| surface number | A4 | A6 | A8 | A10 | A12 | A14 | A16 |
|---|---|---|---|---|---|---|---|
| S1 | 1.1115E−01 | −7.9213E−02 | 4.7038E−02 | −2.0501E−02 | 5.6172E−03 | −8.4995E−04 | 5.3751E−05 |
| S2 | 1.8758E−01 | −1.2520E−01 | 1.8374E−01 | −1.8125E−01 | 1.1239E−01 | −3.5806E−02 | 4.5041E−03 |
| S3 | 3.5824E−03 | −2.8801E−02 | 3.9615E−02 | −2.9571E−02 | 8.1222E−03 | 2.4475E−04 | −3.1358E−04 |
| S4 | −9.9343E−03 | 4.4336E−04 | −2.8594E−04 | −1.3540E−04 | −6.4042E−04 | 2.8798E−04 | −4.3410E−05 |
| S5 | −1.1646E−02 | 6.5259E−03 | −1.3055E−03 | −5.0274E−05 | −7.0651E−06 | 9.1261E−06 | −7.9786E−07 |
| S6 | −5.1780E−03 | −1.7707E−02 | 1.4283E−02 | −5.1595E−03 | 9.2800E−04 | −8.4005E−05 | 3.1848E−06 |
| S7 | 5.0212E−02 | −3.8959E−02 | 1.7737E−02 | −5.5525E−03 | 1.0104E−03 | −8.5400E−05 | 1.8279E−06 |
| S8 | 9.8791E−02 | −1.0631E−01 | 6.3313E−02 | −2.3878E−02 | 5.4211E−03 | −6.6174E−04 | 3.3489E−05 |
| S9 | 6.2817E−02 | −1.2471E−01 | 6.6269E−02 | −3.1648E−02 | 1.0151E−02 | −1.6932E−03 | 1.1040E−04 |
| S10 | 6.5161E−02 | −8.1316E−02 | 2.2261E−02 | −2.6454E−03 | 3.7063E−05 | 2.0784E−05 | −1.6061E−06 |

Table 3 below shows the total effective focal length f of the camera lens assembly in the first embodiment, the effective focal lengths f1-f5 of the lenses, the total track length TTL (i.e., the axial distance from the center of the object-side surface S1 of the first lens L1 to the image plane S13), and the half HFOV of the maximal field-of-view.

TABLE 3

| | parameter | | | | | | |
|---|---|---|---|---|---|---|---|
| | f (mm) | f1 (mm) | f2 (mm) | f3 (mm) | f4 (mm) | f5 (mm) | TTL (mm) | HFOV (°) |
| numerical value | 2.42 | −3.80 | 4.42 | 14.56 | 5.73 | 24.32 | 8.00 | 59.4 |

In this embodiment, the effective focal length f1 of the first lens L1 and the total effective focal length f of the camera lens assembly satisfy: f1/f=−1.57. The effective focal length f2 of the second lens L2 and the total effective focal length f of the camera lens assembly satisfy: f2/f=1.83. The combined focal length f2345 of the second lens L2, the third lens L3, the fourth lens L4, and the fifth lens L5 and the total effective focal length f of the camera lens assembly satisfy: f2345/f=0.97. The total effective focal length f of the camera lens assembly and the entrance pupil diameter EPD of the camera lens assembly satisfy: f/EPD=1.20. The effective semi-diameter DT11 of the object-side surface S1 of the first lens L1 and the entrance pupil diameter EPD of the camera lens assembly satisfy: DT11/EPD=1.07. The effective semi-diameter DT11 of the object-side surface S1 of the first lens L1 and the effective semi-diameter DT52 of the image-side surface S10 of the fifth lens L5 satisfy: DT11/DT52=0.81. The center thickness CT2 of the second lens L2 along the optical axis and the edge thickness ET2 of the second lens L2 satisfy: CT2/ET2=2.99. The sum ΣT of respective axial spacing distances between respective pairs of two adjacent ones of the first lens L1 to the fifth lens L5 and the total track length of the camera lens assembly satisfy: ΣT/TTL=0.29. The axial distance SL from the diaphragm STO to the image plane and the total track length TTL of the camera lens assembly satisfy: SL/TTL=0.84. The half HFOV of the maximal field-of-view of the camera lens assembly satisfies: tan (HFOV/2)=0.57.

Figures 2A, 2B:
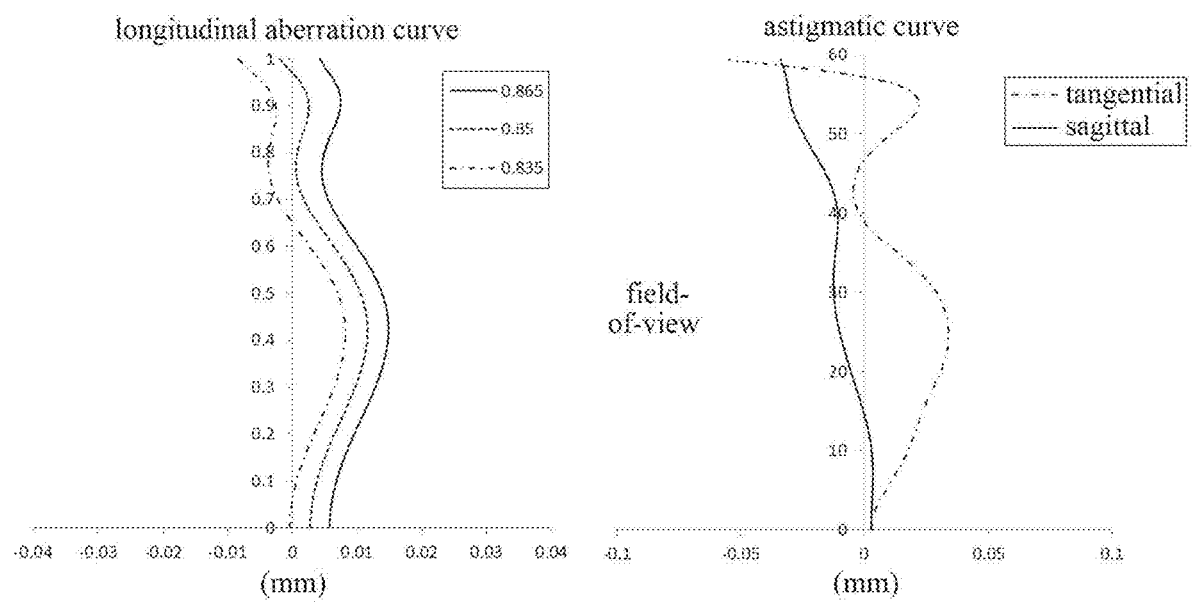
FIGS. 2A-2D respectively illustrate a longitudinal aberration curve, an astigmatic curve, a distortion curve, and a lateral color curve of the camera lens assembly according to the first embodiment.
Figure 2C:
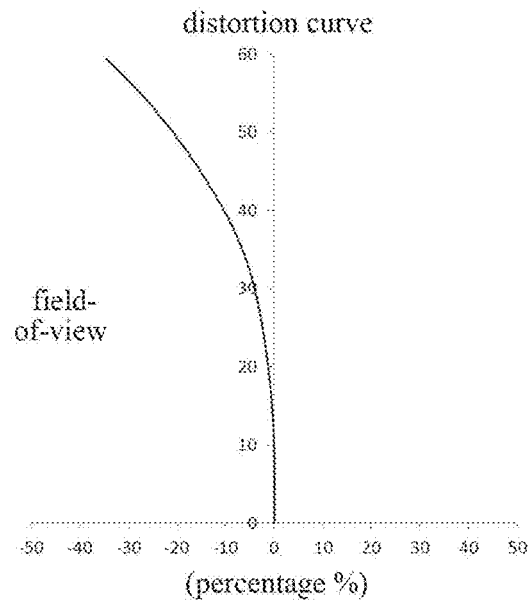
Figure 2D:
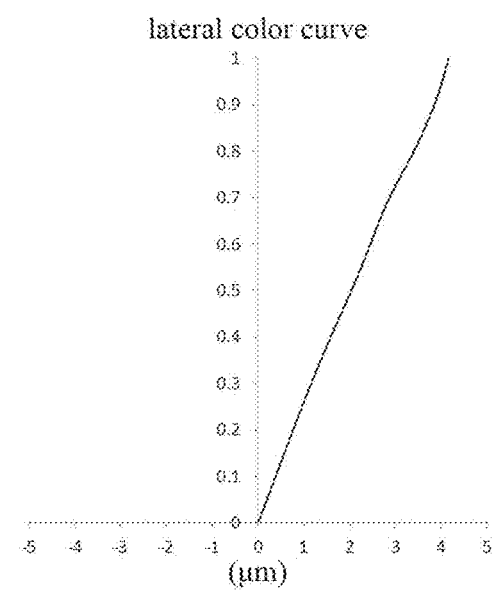

FIG. 2A illustrates the longitudinal aberration curve of the camera lens assembly according to the first embodiment, representing deviations of the focal points where lights of different wavelengths converge after passing through the lens assembly. FIG. 2B illustrates the astigmatic curve of the camera lens assembly according to the first embodiment, representing a curvature of the tangential image plane and a curvature of the sagittal image plane. FIG. 2C illustrates the distortion curve of the camera lens assembly according to the first embodiment, representing degrees of distortion at different viewing angles. FIG. 2D illustrates the lateral color curve of the camera lens assembly according to the first embodiment, representing deviations of different heights of images formed by lights passing through the lens assembly and located on the image plane. It can be seen from FIGS. 2A-2D that the camera lens assembly according to the first embodiment can achieve a good imaging quality.

Second Embodiment

Figure 3:
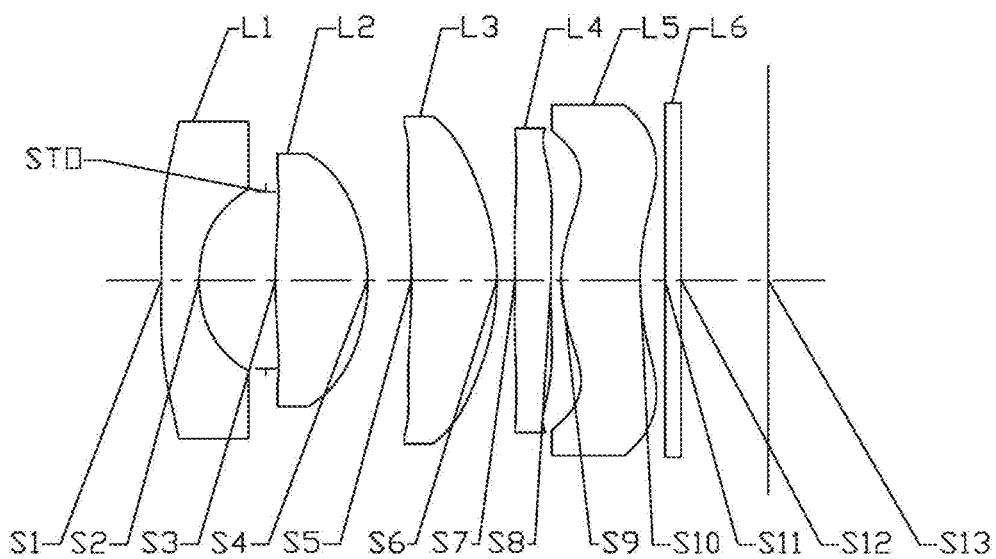
FIG. 3 is a schematic structural diagram illustrating a camera lens assembly according to a second embodiment of the present disclosure.

A camera lens assembly according to a second embodiment of the present disclosure is described below with reference to FIGS. 3-4D. In this embodiment and the following embodiments, for the purpose of brevity, similar descriptions to those in the first embodiment will be omitted. FIG. 3 is a schematic structural diagram illustrating the camera lens assembly according to the second embodiment of the present disclosure.

As shown in FIG. 3, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a concave surface, and an image-side surface S8 of the fourth lens L4 is a concave surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 4 shows the surface type, the radius of curvature, the thickness, the material and the conic coefficient of each lens of the camera lens assembly in the second embodiment. The units of the radius of curvature and the thickness are both millimeters (mm). Table 5 shows the high-order coefficients applicable to each aspheric surface in the second embodiment. The surface type of each aspheric surface may be defined by the formula (1) given in the first embodiment. Table 6 shows the total effective focal length f of the camera lens assembly in the second embodiment, the effective focal lengths f1-f5 of the lenses, the total track length TTL, and the half HFOV of the maximal field-of-view.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | −16.2893 | 0.5000 | 1.53 | 55.8 | 0.0000 |
| S2 | aspheric | 2.0687 | 0.8757 | | | 0.0000 |
| STO | spherical | infinite | 0.1291 | | | |
| S3 | aspheric | 8.5809 | 1.2142 | 1.62 | 23.5 | 0.0000 |
| S4 | aspheric | −2.5282 | 0.5780 | | | 0.0000 |
| S5 | aspheric | −9.5377 | 1.1267 | 1.53 | 55.8 | 0.0000 |
| S6 | aspheric | −3.0653 | 0.2385 | | | 0.0000 |
| S7 | aspheric | −20.2310 | 0.4738 | 1.62 | 23.5 | 0.0000 |
| S8 | aspheric | 236.7184 | 0.1319 | | | 0.0000 |
| S9 | aspheric | 2.0610 | 1.0429 | 1.53 | 55.8 | 0.0000 |
| S10 | aspheric | 3.9009 | 0.3310 | | | 0.0000 |
| S11 | spherical | infinite | 0.2100 | 1.52 | 64.2 | |
| S12 | spherical | infinite | 1.1482 | | | |
| S13 | spherical | infinite | | | | |

TABLE 5

| surface number | A4 | A6 | A8 | A10 | A12 | A14 | A16 |
|---|---|---|---|---|---|---|---|
| S1 | 9.9087E−02 | −7.5992E−02 | 4.7000E−02 | −2.0533E−02 | 5.6172E−03 | −8.4995E−04 | 5.3751E−05 |
| S2 | 1.6465E−01 | −1.2285E−01 | 1.7774E−01 | −1.7747E−01 | 1.1239E−01 | −3.5806E−02 | 4.5041E−03 |
| S3 | −6.9844E−03 | −2.7964E−02 | 3.9514E−02 | −2.9646E−02 | 8.1222E−03 | 2.4475E−04 | −3.1358E−04 |
| S4 | 1.3885E−03 | −2.9923E−03 | −6.6168E−05 | −1.1022E−04 | −6.4042E−04 | 2.8798E−04 | −4.3410E−05 |
| S5 | 1.3711E−02 | 4.8909E−03 | −1.7996E−03 | −7.6668E−06 | −7.0625E−06 | 9.1261E−06 | −7.9786E−07 |
| S6 | 1.3653E−02 | −1.6733E−02 | 1.4097E−02 | −5.1898E−03 | 9.2800E−04 | −8.4005E−05 | 3.1848E−06 |
| S7 | 6.4216E−02 | −4.8051E−02 | 2.0303E−02 | −5.7661E−03 | 1.0104E−03 | −8.5400E−05 | 1.8279E−06 |
| S8 | 6.7849E−02 | −1.0331E−01 | 6.3245E−02 | −2.3736E−02 | 5.4211E−03 | −6.6174E−04 | 3.3489E−05 |
| S9 | 4.0099E−03 | −9.2323E−02 | 6.1038E−02 | −3.1791E−02 | 1.0151E−02 | −1.6932E−03 | 1.1040E−04 |
| S10 | 4.6468E−02 | −5.0418E−02 | 1.5252E−02 | −3.5908E−03 | 7.7023E−04 | −1.1027E−04 | 6.6280E−06 |

TABLE 6

| | f (mm) | f1 (mm) | f2 (mm) | f3 (mm) | f4 (mm) | f5 (mm) | TTL (mm) | HFOV (°) |
|---|---|---|---|---|---|---|---|---|
| | | | | parameter | | | | |
| numerical value | 2.21 | −3.45 | 3.28 | 8.07 | −30.00 | 6.92 | 8.00 | 58.5 |

Figure 4A:
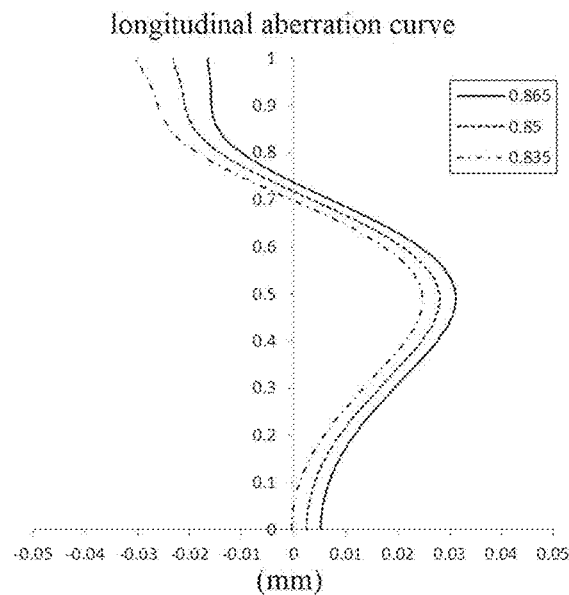
FIGS. 4A-4D respectively illustrate a longitudinal aberration curve, an astigmatic curve, a distortion curve, and a lateral color curve of the camera lens assembly according to the second embodiment.
Figure 4B:
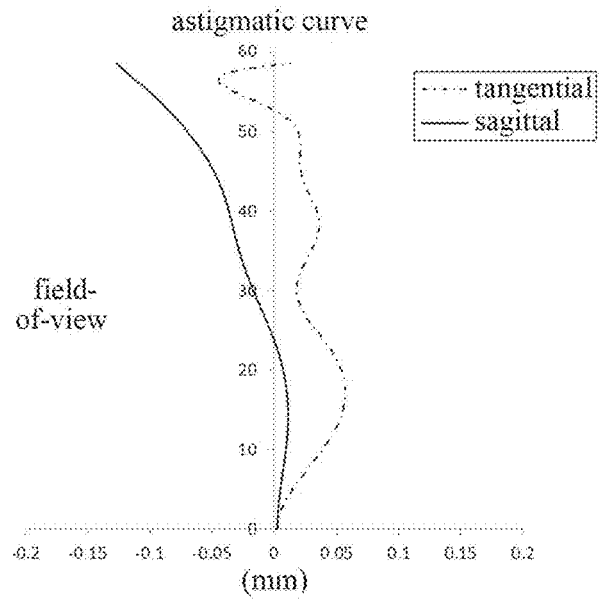
Figure 4C:
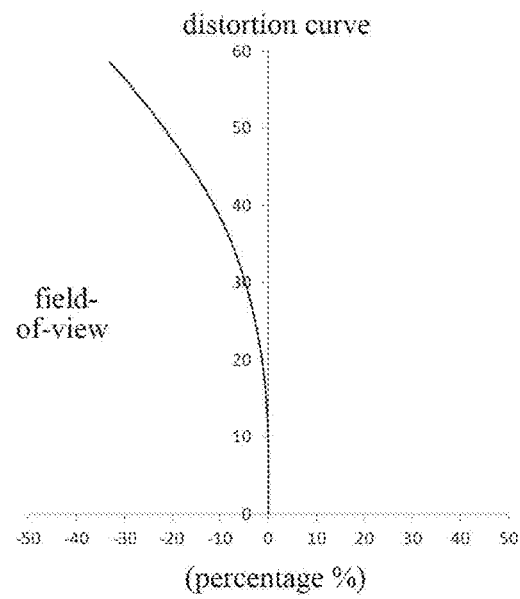
Figure 4D:
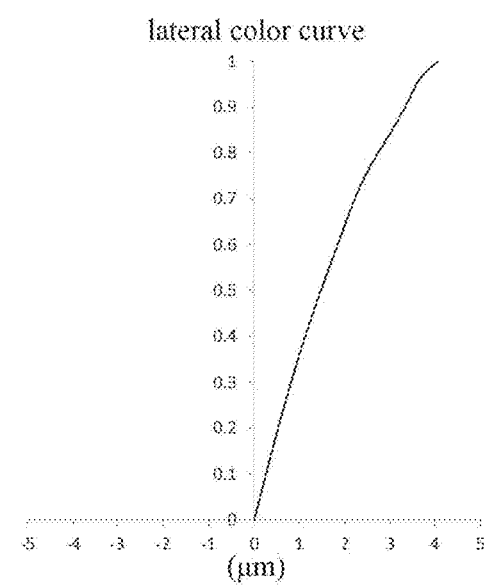

FIG. 4A illustrates the longitudinal aberration curve of the camera lens assembly according to the second embodiment, representing deviations of the focal points where lights of different wavelengths converge after passing through the lens assembly. FIG. 4B illustrates the astigmatic curve of the camera lens assembly according to the second embodiment, representing a curvature of the tangential image plane and a curvature of the sagittal image plane. FIG. 4C illustrates the distortion curve of the camera lens assembly according to the second embodiment, representing degrees of distortion at different viewing angles. FIG. 4D illustrates the lateral color curve of the camera lens assembly according to the second embodiment, representing deviations of different heights of images formed by lights passing through the lens assembly and located on the image plane. It can be seen from FIGS. 4A-4D that the camera lens assembly according to the second embodiment can achieve a good imaging quality.

Third Embodiment

Figure 5:
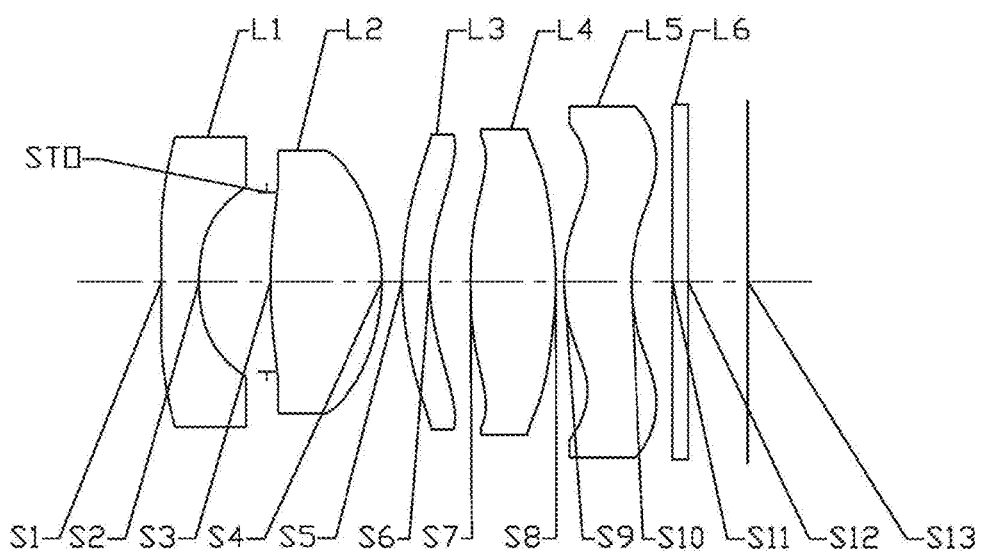
FIG. 5 is a schematic structural diagram illustrating a camera lens assembly according to a third embodiment of the present disclosure.

A camera lens assembly according to a third embodiment of the present disclosure is described below with reference to FIGS. 5-6D. FIG. 5 is a schematic structural diagram illustrating the camera lens assembly according to the third embodiment of the present disclosure.

As shown in FIG. 5, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 7 shows the surface type, the radius of curvature, the thickness, the material and the conic coefficient of each lens of the camera lens assembly in the third embodiment. The units of the radius of curvature and the thickness are both millimeters (mm). Table 8 shows the high-order coefficients applicable to each aspheric surface in the third embodiment. The surface type of each aspheric surface may be defined by the formula (1) given in the first embodiment. Table 9 shows the total effective focal length f of the camera lens assembly in the third embodiment, the effective focal lengths f1-f5 of the lenses, the total track length TTL, and the half HFOV of the maximal field-of-view.

TABLE 7

| surface number | surface type | radius of curvature | thickness | refractive index | abbe number | conic coefficient |
|---|---|---|---|---|---|---|
| | | | | material | | |
| OBJ | spherical | infinite | infinite | | | |
| S1 | aspheric | −10.6750 | 0.4997 | 1.53 | 55.8 | 0.0000 |
| S2 | aspheric | 2.6353 | 0.9039 | | | 0.0000 |
| STO | spherical | infinite | 0.0500 | | | |
| S3 | aspheric | 6.6892 | 1.4936 | 1.62 | 23.5 | 0.0000 |
| S4 | aspheric | −2.7068 | 0.2717 | | | 0.0000 |
| S5 | aspheric | 4.0625 | 0.3678 | 1.53 | 55.8 | 0.0000 |
| S6 | aspheric | 2.7080 | 0.5451 | | | 0.0000 |
| S7 | aspheric | 9.4532 | 1.1391 | 1.62 | 23.5 | 0.0000 |
| S8 | aspheric | −3.5515 | 0.1074 | | | 0.0000 |
| S9 | aspheric | 2.4628 | 0.9017 | 1.53 | 55.8 | 0.0000 |
| S10 | aspheric | 2.4567 | 0.5550 | | | 0.0000 |
| S11 | spherical | infinite | 0.2100 | 1.52 | 64.2 | |
| S12 | spherical | infinite | 0.7942 | | | |
| S13 | spherical | infinite | | | | |

TABLE 8

| surface number | A4 | A6 | A8 | A10 | A12 | A14 | A16 |
|---|---|---|---|---|---|---|---|
| S1 | 1.0104E−01 | −7.5686E−02 | 4.6954E−02 | −2.0524E−02 | 5.6172E−03 | −8.4995E−04 | 5.3751E−05 |
| S2 | 1.5784E−01 | −1.2188E−01 | 1.7700E−01 | −1.7882E−01 | 1.1239E−01 | −3.5806E−02 | 4.5041E−03 |
| S3 | 1.6458E−03 | −3.0232E−02 | 4.4231E−02 | −3.0942E−02 | 8.1222E−03 | 2.4475E−04 | −3.1358E−04 |
| S4 | 8.4140E−03 | −3.2979E−03 | −8.9285E−04 | 5.1600E−04 | −6.4042E−04 | 2.8798E−04 | −4.3410E−05 |
| S5 | −1.9357E−02 | 9.1354E−03 | −1.6958E−03 | −3.0318E−05 | −8.4134E−06 | 9.1002E−06 | −7.9786E−07 |
| S6 | −2.1365E−02 | −1.9303E−02 | 1.4527E−02 | −5.2248E−03 | 9.2924E−04 | −8.4048E−05 | 3.1848E−06 |
| S7 | 6.7095E−02 | −4.3791E−02 | 1.7322E−02 | −5.5388E−03 | 1.0094E−03 | −8.5400E−05 | 1.8279E−06 |
| S8 | 1.2311E−01 | −1.1135E−01 | 6.3520E−02 | −2.3843E−02 | 5.4202E−03 | −6.6174E−04 | 3.3489E−05 |

TABLE 8-continued

| surface number | A4 | A6 | A8 | A10 | A12 | A14 | A16 |
|---|---|---|---|---|---|---|---|
| S9 | 6.6044E−02 | −1.0506E−01 | 6.1482E−02 | −3.1293E−02 | 1.0155E−02 | −1.6932E−03 | 1.1040E−04 |
| S10 | 8.4803E−03 | −1.2274E−02 | −1.4930E−02 | 8.6860E−03 | −1.9470E−03 | 2.0546E−04 | −8.7448E−06 |

TABLE 9

| | parameter | | | | | | |
|---|---|---|---|---|---|---|---|
| | f (mm) | f1 (mm) | f2 (mm) | f3 (mm) | f4 (mm) | f5 (mm) | TTL (mm) | HFOV (°) |
| numerical value | 2.23 | −3.95 | 3.30 | −16.98 | 4.30 | 37.53 | 7.84 | 57.9 |

Figures 6A, 6B:
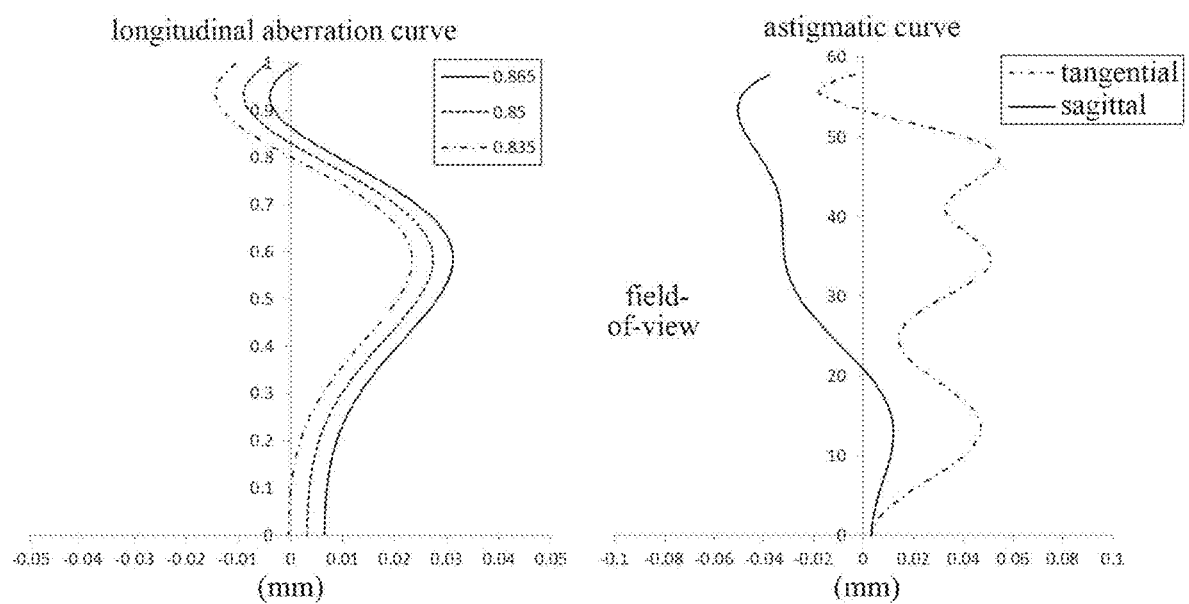
FIGS. 6A-6D respectively illustrate a longitudinal aberration curve, an astigmatic curve, a distortion curve, and a lateral color curve of the camera lens assembly according to the third embodiment.
Figure 6C:
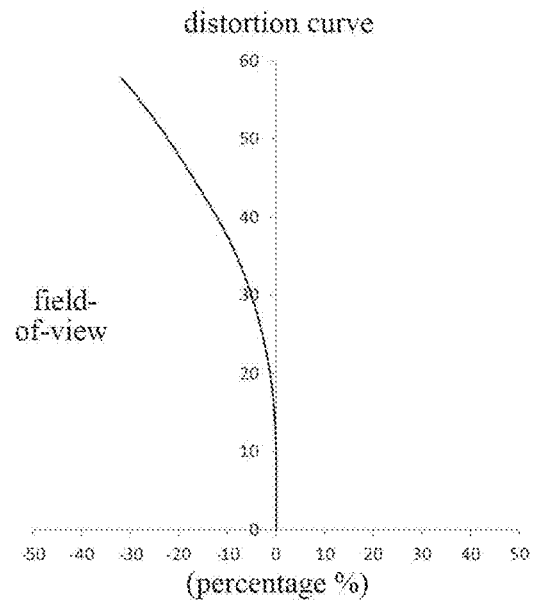
Figure 6D:
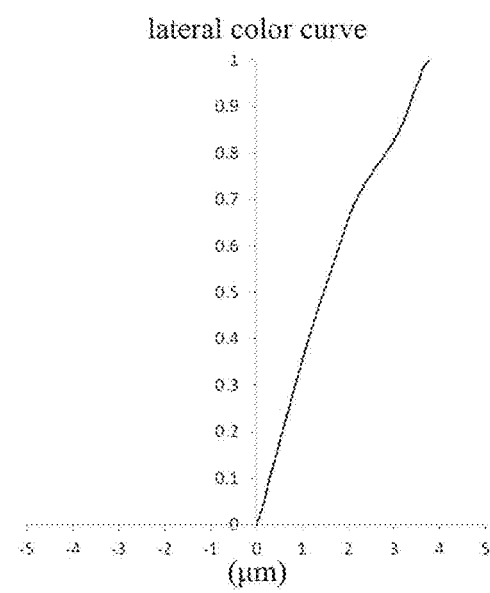

FIG. 6A illustrates the longitudinal aberration curve of the camera lens assembly according to the third embodiment, representing deviations of the focal points where lights of different wavelengths converge after passing through the lens assembly. FIG. 6B illustrates the astigmatic curve of the camera lens assembly according to the third embodiment, representing a curvature of the tangential image plane and a curvature of the sagittal image plane. FIG. 6C illustrates the distortion curve of the camera lens assembly according to the third embodiment, representing degrees of distortion at different viewing angles. FIG. 6D illustrates the lateral color curve of the camera lens assembly according to the third embodiment, representing deviations of different heights of images formed by lights passing through the lens assembly and located on the image plane. It can be seen from FIGS. 6A-6D that the camera lens assembly according to the third embodiment can achieve a good imaging quality.

Fourth Embodiment

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

Figure 7:
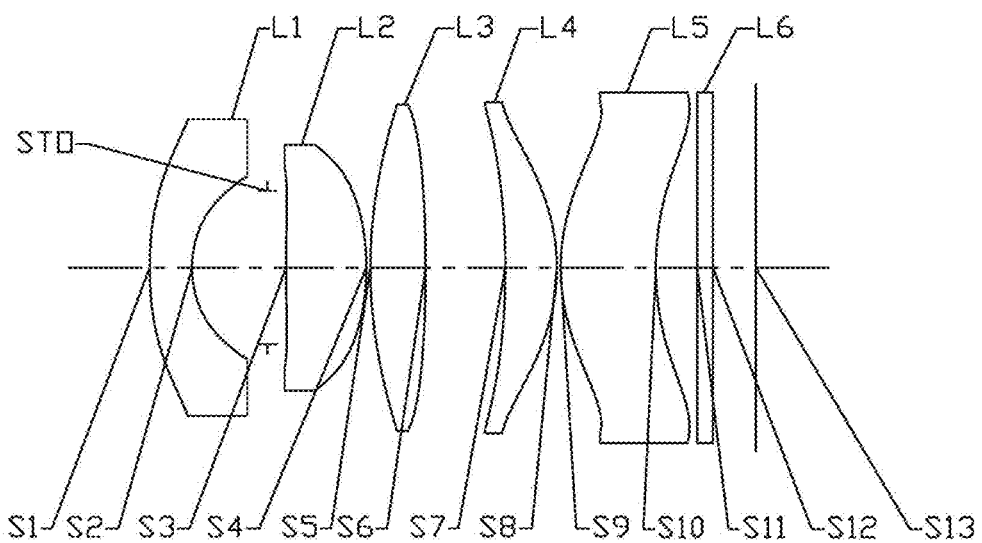
FIG. 7 is a schematic structural diagram illustrating a camera lens assembly according to a fourth embodiment of the present disclosure.

As shown in FIG. 7, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a concave surface, and an image-side surface S8 of the fourth lens L4 is a convex surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 10 shows the surface type, the radius of curvature, the thickness, the material and the conic coefficient of each lens of the camera lens assembly in the fourth embodiment. The radius of curvature and the thickness are both millimeters (mm). Table 11 shows the high-order coefficients applicable to each aspheric surface in the fourth embodiment. The surface type of each aspheric surface may be defined by the formula (1) given in the first embodiment. Table 12 shows the total effective focal length f of the camera lens assembly in the fourth embodiment, the effective focal lengths f1-f5 of the lenses, the total track length TTL, and the half HFOV of the maximal field-of-view.

TABLE 10

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 4.6260 | 0.5607 | 1.53 | 55.8 | 0.0000 |
| S2 | aspheric | 1.4360 | 0.9939 | | | 0.0000 |
| STO | spherical | infinite | 0.2465 | | | |
| S3 | aspheric | 18.7795 | 1.0585 | 1.53 | 55.8 | 0.0000 |
| S4 | aspheric | −3.3205 | 0.0531 | | | 0.0000 |
| S5 | aspheric | 6.0796 | 0.7303 | 1.53 | 55.8 | 0.0000 |
| S6 | aspheric | −17.0918 | 1.0523 | | | 0.0000 |
| S7 | aspheric | −9.4753 | 0.6792 | 1.53 | 55.8 | 0.0000 |

TABLE 10-continued

| surface number | surface type | radius of curvature | thickness | material refractive index | abbe number | conic coefficient |
|---|---|---|---|---|---|---|
| S8 | aspheric | −2.6350 | 0.0500 | | | 0.0000 |
| S9 | aspheric | 2.6414 | 1.2568 | 1.62 | 23.5 | 0.0000 |
| S10 | aspheric | 4.0675 | 0.5430 | | | 0.0000 |
| S11 | spherical | infinite | 0.2100 | 1.52 | 64.2 | |
| S12 | spherical | infinite | 0.5656 | | | |
| S13 | spherical | infinite | | | | |

TABLE 11

| surface number | A4 | A6 | A8 | A10 | A12 | A14 | A16 |
|---|---|---|---|---|---|---|---|
| S1 | 1.8509E−02 | −2.3450E−03 | −4.5646E−04 | −9.9159E−06 | 9.7080E−06 | 2.0726E−06 | −3.5303E−07 |
| S2 | 3.8669E−02 | 9.0798E−03 | 4.4786E−03 | −8.7981E−03 | −2.0173E−15 | −6.2024E−17 | −1.9349E−18 |
| S3 | −1.3291E−02 | 4.8394E−04 | −6.1160E−03 | 1.8879E−03 | −2.9145E−14 | −5.9201E−16 | −1.2255E−17 |
| S4 | −1.8485E−02 | −5.4299E−03 | 1.0664E−03 | −7.1994E−04 | −2.9156E−14 | −5.9201E−16 | −1.2255E−17 |
| S5 | −2.6105E−03 | 1.6317E−04 | 3.6449E−05 | −8.4081E−06 | −2.9257E−14 | −5.9293E−16 | −1.2205E−17 |
| S6 | −1.1898E−03 | −9.4546E−05 | −8.1790E−05 | −1.1827E−05 | −2.8675E−14 | −5.9037E−16 | −1.2283E−17 |
| S7 | 8.1072E−05 | −6.7499E−04 | 2.3750E−05 | 1.5372E−05 | −1.2478E−07 | −6.0865E−16 | −1.2361E−17 |
| S8 | 4.5229E−03 | 1.9497E−03 | 1.8480E−04 | 1.0784E−05 | −2.9913E−14 | −5.7895E−16 | −1.2183E−17 |
| S9 | −1.2586E−02 | −1.6313E−03 | −1.3523E−04 | −4.0942E−05 | −2.3649E−08 | −5.8617E−16 | −1.2377E−17 |
| S10 | 1.4921E−02 | −5.2059E−03 | −1.2672E−04 | 3.8428E−05 | −5.3720E−15 | −8.1462E−17 | −2.0510E−18 |

TABLE 12

| | parameter | | | | | | |
|---|---|---|---|---|---|---|---|
| | f (mm) | f1 (mm) | f2 (mm) | f3 (mm) | f4 (mm) | f5 (mm) | TTL (mm) | HFOV (°) |
| numerical value | 2.03 | −4.20 | 5.44 | 8.59 | 6.69 | 9.07 | 8.00 | 56.6 |

Figure 8A:
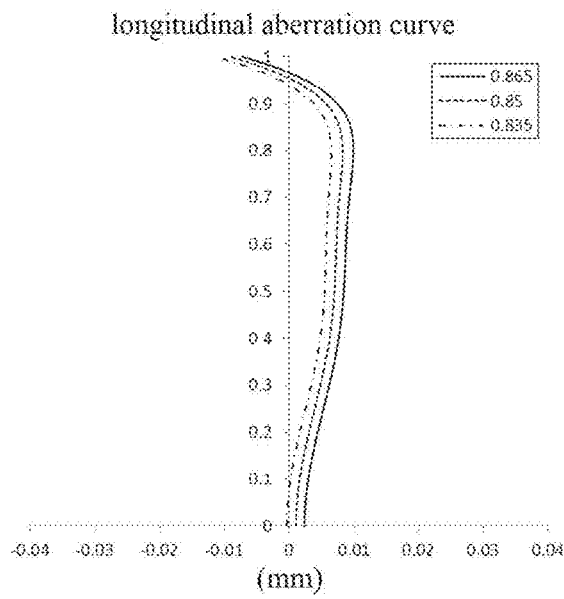
FIGS. 8A-8D respectively illustrate a longitudinal aberration curve, an astigmatic curve, a distortion curve, and a lateral color curve of the camera lens assembly according to the fourth embodiment.
Figure 8B:
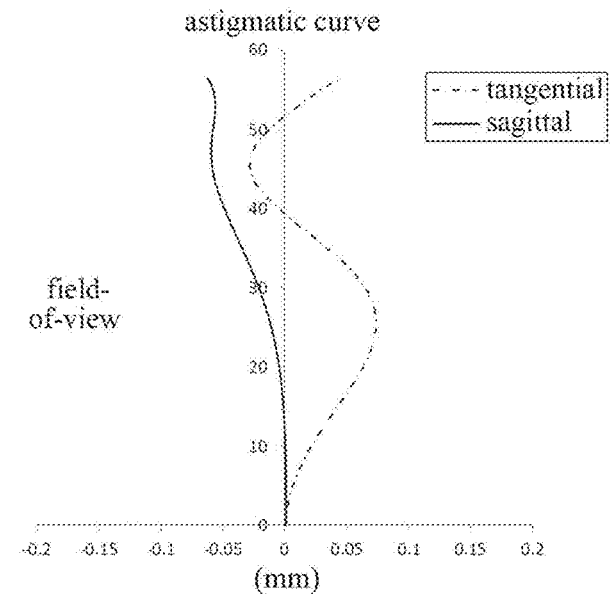
Figure 8C:
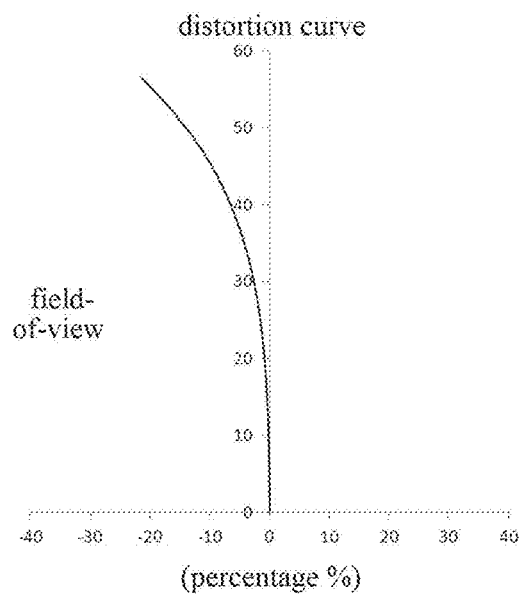
Figure 8D:
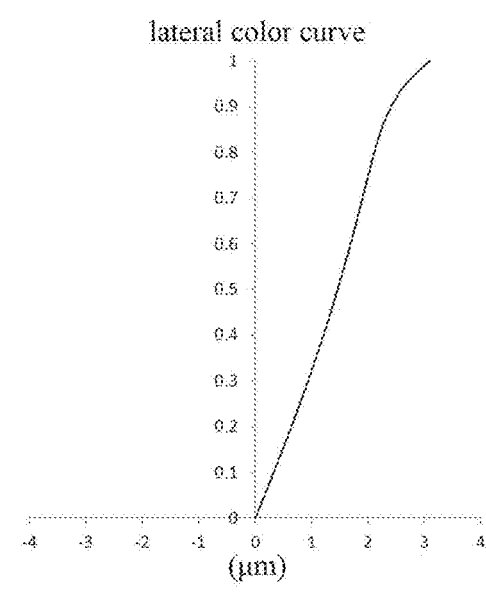

FIG. 8A illustrates the longitudinal aberration curve of the camera lens assembly according to the fourth embodiment, representing deviations of the focal points where lights of different wavelengths converge after passing through the lens assembly. FIG. 8B illustrates the astigmatic curve of the camera lens assembly according to the fourth embodiment, representing a curvature of the tangential image plane and a curvature of the sagittal image plane. FIG. 8C illustrates the distortion curve of the camera lens assembly according to the fourth embodiment, representing degrees of distortion at different viewing angles. FIG. 8D illustrates the lateral color curve of the camera lens assembly according to the fourth embodiment, representing deviations of different heights of images formed by lights passing through the lens assembly and located on the image plane. It can be seen from FIGS. 8A-8D that the camera lens assembly according to the fourth embodiment can achieve a good imaging quality.

Fifth Embodiment

Figure 9:
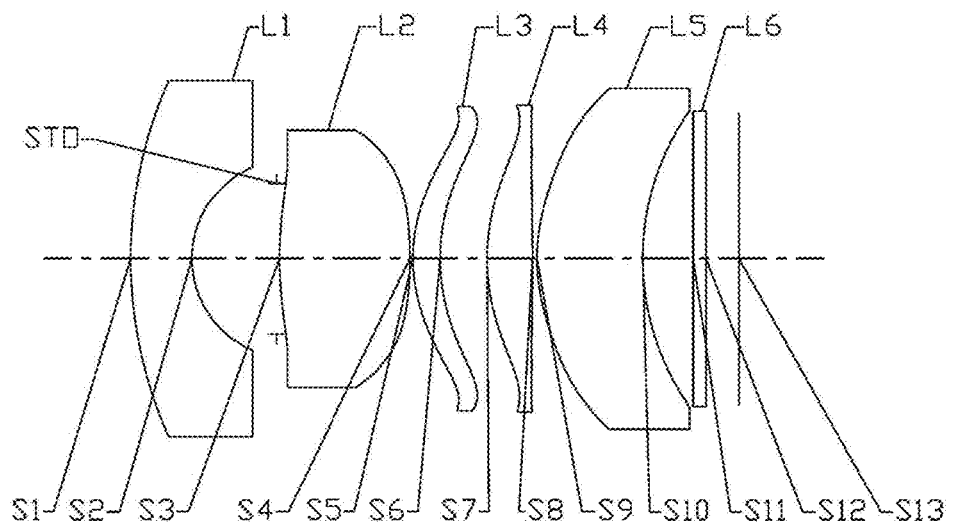
FIG. 9 is a schematic structural diagram illustrating a camera lens assembly according to a fifth embodiment of the present disclosure.

A camera lens assembly according to a fifth embodiment of the present disclosure is described below with reference to FIGS. 9-10D. FIG. 9 is a schematic structural diagram illustrating the camera lens assembly according to the fifth embodiment of the present disclosure.

As shown in FIG. 9, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both spherical surfaces.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 13 shows the surface type, the radius of curvature, the thickness, the material and the conic coefficient of each lens of the camera lens assembly in the fifth embodiment. The radius of curvature and the thickness are both millimeters (mm). Table 14 shows the high-order coefficients applicable to each aspheric surface in the fifth embodiment. The surface type of each aspheric surface may be defined by the formula (1) given in the first embodiment. Table 15 shows the total effective focal length f of the camera lens assembly in the fifth embodiment, the effective focal lengths f1-f5 of the lenses, the total track length TTL, and the half HFOV of the maximal field-of-view.

TABLE 13

| surface number | surface type | radius of curvature | thickness | material refractive index | material abbe number | conic coefficient |
|---|---|---|---|---|---|---|
| OBJ | spherical | infinite | infinite | | | |
| S1 | spherical | 7.1930 | 1.0041 | 1.53 | 55.8 | 0.0000 |
| S2 | spherical | 1.6409 | 1.3855 | | | 0.0000 |
| STO | spherical | infinite | 0.0535 | | | |
| S3 | aspheric | 6.2758 | 2.1493 | 1.53 | 55.8 | 0.0000 |
| S4 | aspheric | −6.8984 | 0.0500 | | | 0.0000 |
| S5 | aspheric | 2.7160 | 0.4456 | 1.53 | 55.8 | 0.0000 |
| S6 | aspheric | 3.2743 | 0.7709 | | | 0.0000 |
| S7 | aspheric | 3.5257 | 0.7454 | 1.53 | 55.8 | 0.0000 |
| S8 | aspheric | −29.3362 | 0.0728 | | | 0.0000 |
| S9 | aspheric | 3.0028 | 1.7460 | 1.62 | 23.5 | 0.0000 |
| S10 | spherical | 4.2436 | 0.8270 | | | |
| S11 | spherical | infinite | 0.2100 | 1.52 | 64.2 | |
| S12 | spherical | infinite | 0.5399 | | | |
| S13 | spherical | infinite | | | | |

TABLE 14

| surface number | A4 | A6 | A8 | A10 | A12 | A14 | A16 |
|---|---|---|---|---|---|---|---|
| S3 | −1.1619E−02 | 7.3113E−03 | −4.9049E−03 | 7.9842E−04 | −4.5532E−14 | −1.0883E−15 | −2.7234E−17 |
| S4 | −1.9859E−02 | −4.6259E−03 | 1.5580E−03 | −2.2089E−04 | 3.7275E−06 | −1.0885E−15 | −2.7236E−17 |
| S5 | −8.9321E−03 | −4.3339E−04 | −9.7024E−06 | −3.9444E−05 | −1.0257E−07 | −2.6512E−07 | −2.7215E−17 |
| S6 | −2.9512E−03 | 9.8659E−06 | −1.7126E−04 | −3.4165E−05 | 5.0359E−07 | 9.2698E−08 | −2.7307E−17 |
| S7 | 6.2035E−04 | −1.7352E−03 | −6.1179E−05 | −2.0162E−05 | 1.7676E−06 | 9.1516E−08 | −2.7386E−17 |
| S8 | 6.6532E−03 | −6.0848E−04 | −1.2730E−04 | 2.0161E−05 | −4.7935E−07 | 4.1997E−08 | −2.6684E−17 |
| S9 | −1.8662E−02 | 9.7676E−04 | 1.6342E−04 | −1.5844E−05 | −8.1029E−07 | 1.8927E−08 | −3.6774E−09 |

TABLE 15

| | parameter | | | | | | |
|---|---|---|---|---|---|---|---|
| f (mm) | f1 (mm) | f2 (mm) | f3 (mm) | f4 (mm) | f5 (mm) | TTL (mm) | HFOV (°) |
| numerical value 2.34 | −4.30 | 6.60 | 23.65 | 6.01 | 10.75 | 10.00 | 58.8 |

Figures 10A, 10B:
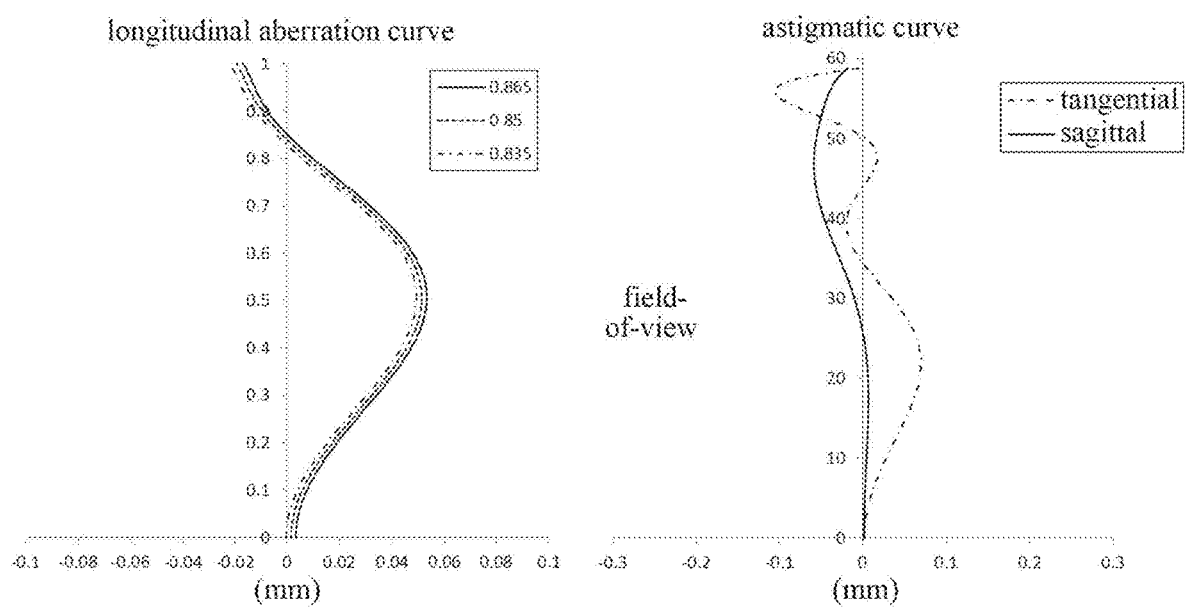
FIGS. 10A-10D respectively illustrate a longitudinal aberration curve, an astigmatic curve, a distortion curve, and a lateral color curve of the camera lens assembly according to the fifth embodiment.
Figure 10C:
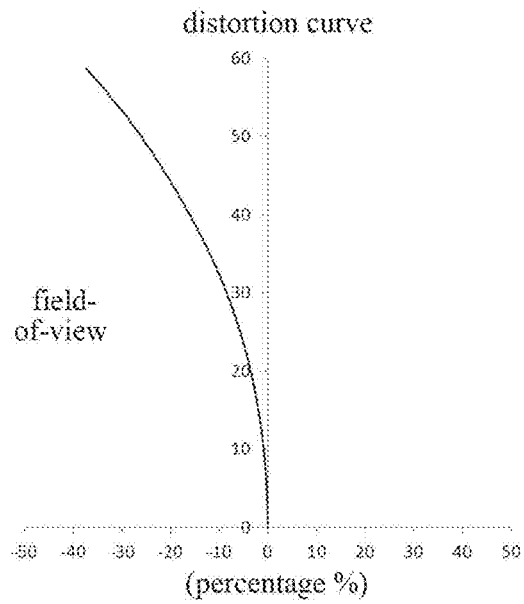
Figure 10D:
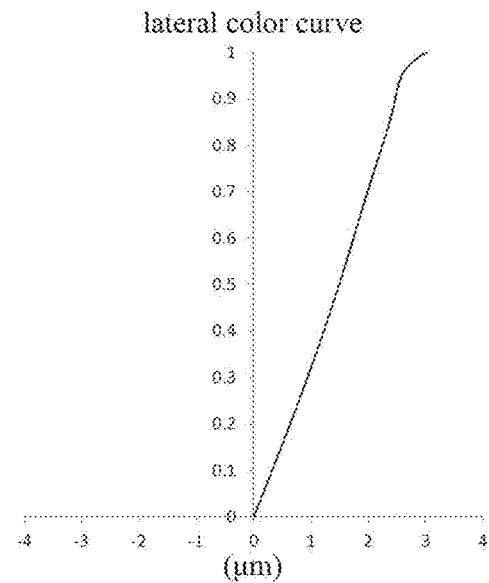

FIG. 10A illustrates the longitudinal aberration curve of the camera lens assembly according to the fifth embodiment, representing deviations of the focal points where lights of different wavelengths converge after passing through the lens assembly. FIG. 10B illustrates the astigmatic curve of the camera lens assembly according to the fifth embodiment, representing a curvature of the tangential image plane and a curvature of the sagittal image plane. FIG. 10C illustrates the distortion curve of the camera lens assembly according to the fifth embodiment, representing degrees of distortion at different viewing angles. FIG. 10D illustrates the lateral color curve of the camera lens assembly according to the fifth embodiment, representing deviations of different heights of images formed by lights passing through the lens assembly and located on the image plane. It can be seen from FIGS. 10A-10D that the camera lens assembly according to the fifth embodiment can achieve a good imaging quality.

Sixth Embodiment

Figure 11:
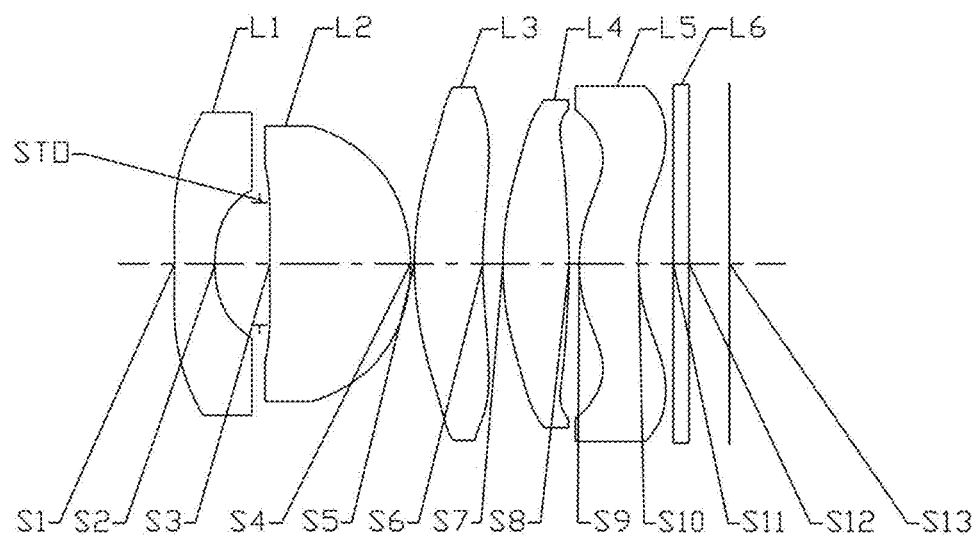
FIG. 11 is a schematic structural diagram illustrating a camera lens assembly according to the sixth embodiment of the present disclosure.

A camera lens assembly according to a sixth embodiment of the present disclosure is described below with reference to FIGS. 11-12D. FIG. 11 is a schematic structural diagram illustrating the camera lens assembly according to the sixth embodiment of the present disclosure.

As shown in FIG. 11, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both spherical surfaces.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 16 shows the surface type, the radius of curvature, the thickness, the material and the conic coefficient of each lens of the camera lens assembly in the sixth embodiment. The units of the radius of curvature and the thickness are both millimeters (mm). Table 17 shows the high-order coefficients applicable to each aspheric surface in the sixth embodiment. The surface type of each aspheric surface may be defined by the formula (1) given in the first embodiment. Table 18 shows the total effective focal length f of the camera lens assembly in the sixth embodiment, the effective focal lengths f1-f5 of the lenses, the total track length TTL, and the half HFOV of the maximal field-of-view.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | −10.6501 | 0.5375 | 1.53 | 55.8 | 0.0000 |
| S2 | aspheric | 1.9094 | 0.5956 | | | 0.0000 |
| STO | spherical | infinite | 0.1393 | | | |
| S3 | aspheric | 43.4512 | 1.8791 | 1.62 | 23.5 | 0.0000 |
| S4 | aspheric | −2.3474 | 0.0500 | | | 0.0000 |
| S5 | aspheric | 4.3440 | 0.9139 | 1.53 | 55.8 | 0.0000 |
| S6 | aspheric | 6.2918 | 0.2697 | | | 0.0000 |
| S7 | aspheric | 4.9214 | 0.8831 | 1.62 | 23.5 | 0.0000 |
| S8 | aspheric | −5.3467 | 0.1352 | | | 0.0000 |
| S9 | aspheric | 2.2096 | 0.7913 | 1.53 | 55.8 | 0.0000 |
| S10 | aspheric | 2.5726 | 0.4640 | | | 0.0000 |
| S11 | spherical | infinite | 0.2100 | 1.52 | 64.2 | |
| S12 | spherical | infinite | 0.5399 | | | |
| S13 | spherical | infinite | | | | |

TABLE 17

| surface number | A4 | A6 | A8 | A10 | A12 | A14 | A16 |
|---|---|---|---|---|---|---|---|
| S1 | 1.1848E−01 | −7.9273E−02 | 4.7614E−02 | −2.0567E−02 | 5.6172E−03 | −8.4995E−04 | 5.3751E−05 |
| S2 | 2.1965E−01 | −9.9613E−02 | 1.6577E−01 | −1.3264E−01 | 1.1239E−01 | −3.5806E−02 | 4.5041E−03 |
| S3 | −1.2605E−02 | −3.5800E−02 | 4.2572E−02 | −2.8874E−02 | 8.1222E−03 | 2.4475E−04 | −3.1358E−04 |
| S4 | −1.5651E−02 | −2.9704E−03 | 5.8594E−04 | 5.7354E−05 | −6.4042E−04 | 2.8798E−04 | −4.3410E−05 |
| S5 | −1.4415E−02 | 6.4902E−03 | −1.2483E−03 | −4.1058E−05 | −7.0651E−06 | 9.1261E−06 | −7.9786E−07 |
| S6 | −1.2859E−02 | −1.7905E−02 | 1.4351E−02 | −5.1431E−03 | 9.2800E−04 | −8.4005E−05 | 3.1848E−06 |
| S7 | 4.1991E−02 | −3.8691E−02 | 1.7844E−02 | −5.4871E−03 | 1.0104E−03 | −8.5400E−05 | 1.8279E−06 |
| S8 | 1.1346E−01 | −1.0896E−01 | 6.3340E−02 | −2.3718E−02 | 5.4211E−03 | −6.6174E−04 | 3.3489E−05 |
| S9 | 6.4989E−02 | −1.1895E−01 | 6.6043E−02 | −3.1895E−02 | 1.0151E−02 | −1.6932E−03 | 1.1040E−04 |
| S10 | 5.4725E−02 | −5.8346E−02 | 7.4827E−03 | 3.1368E−03 | −1.2095E−03 | 1.5307E−04 | −6.9360E−06 |

TABLE 18

| | parameter | | | | | | | |
|---|---|---|---|---|---|---|---|---|
| | f (mm) | f1 (mm) | f2 (mm) | f3 (mm) | f4 (mm) | f5 (mm) | TTL (mm) | HFOV (°) |
| numerical value | 1.61 | −3.02 | 3.64 | 22.87 | 4.27 | 16.92 | 7.41 | 75.9 |

Figure 12A:
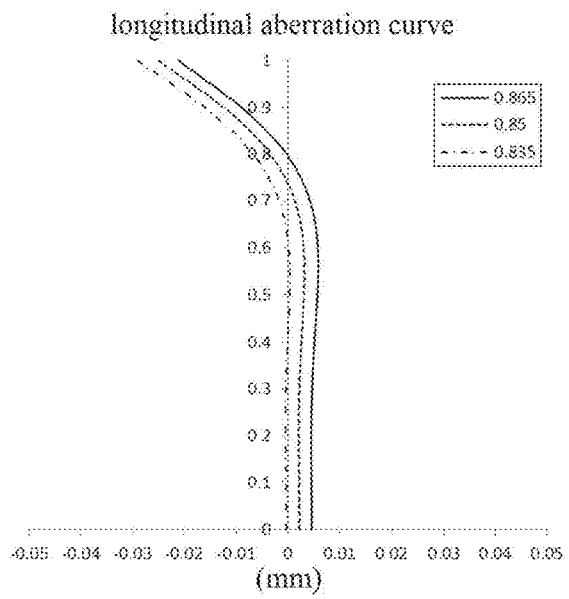
FIGS. 12A-12D respectively illustrate a longitudinal aberration curve, an astigmatic curve, a distortion curve, and a lateral color curve of the camera lens assembly according to the sixth embodiment.
Figure 12B:
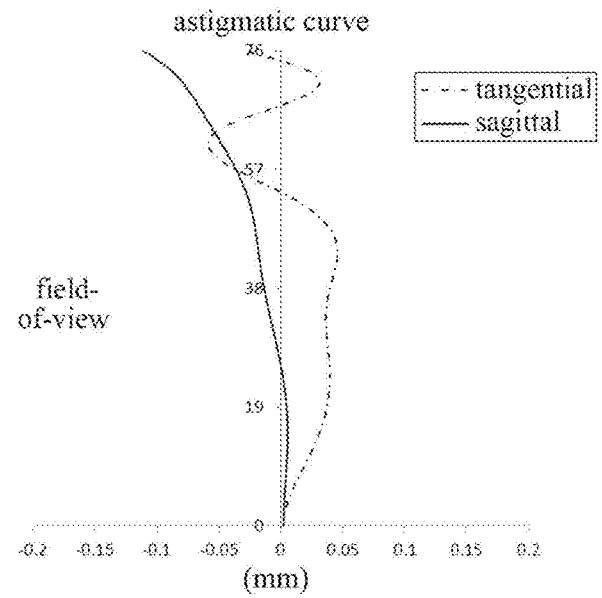
Figure 12C:
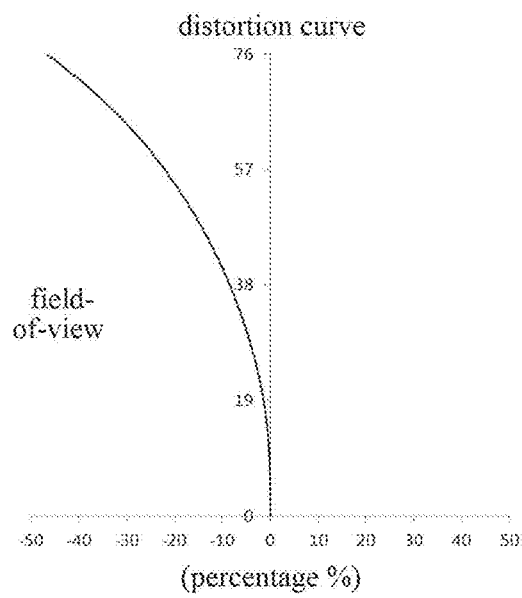
Figure 12D:
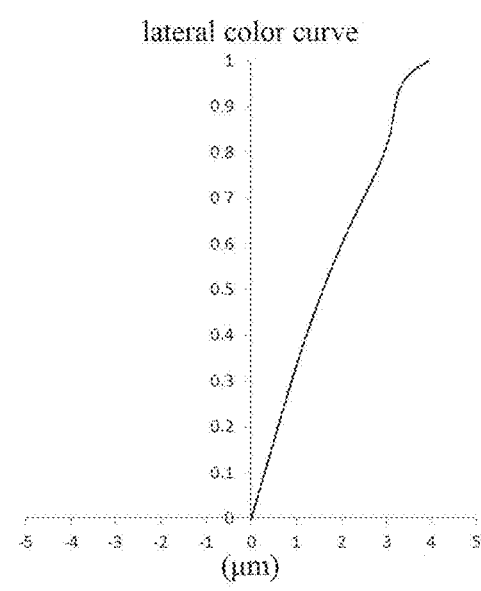

FIG. 12A illustrates the longitudinal aberration curve of the camera lens assembly according to the sixth embodiment, representing deviations of the focal points where lights of different wavelengths converge after passing through the lens assembly. FIG. 12B illustrates the astigmatic curve of the camera lens assembly according to the sixth embodiment, representing a curvature of the tangential image plane and a curvature of the sagittal image plane. FIG. 12C illustrates the distortion curve of the camera lens assembly according to the sixth embodiment, representing degrees of distortion at different viewing angles. FIG. 12D illustrates the lateral color curve of the camera lens assembly according to the sixth embodiment, representing deviations of different heights of images formed by lights passing through the lens assembly and located on the image plane. It can be seen from FIGS. 12A-12D that the camera lens assembly according to the sixth embodiment can achieve a good imaging quality.

Seventh Embodiment

A camera lens assembly according to a seventh embodiment of the present disclosure is described below with reference to FIGS. 13-14D. FIG. 13 is a schematic structural diagram illustrating the camera lens assembly according to the seventh embodiment of the present disclosure.

As shown in FIG. 13, the camera lens assembly includes, sequentially along an optical axis from an object side to an image side, a first lens L1, a second lens L2, a third lens L3, a fourth lens L4, a fifth lens L5, and an image plane S13. The camera lens assembly may further include a photosensitive element disposed on the image plane S13.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both spherical surfaces.

The second lens L2 has a positive refractive power, an object-side surface S3 of the second lens L2 is a concave surface, and an image-side surface S4 of the second lens L2 is a convex surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a positive refractive power, an object-side surface S9 of the fifth lens L5 is a convex surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12.

Alternatively, a diaphragm STO for limiting light beams may be disposed between the first lens L1 and the second lens L2, to improve the imaging quality of the camera lens assembly.

Table 19 shows the surface type, the radius of curvature, the thickness, the material and the conic coefficient of each lens of the camera lens assembly in the seventh embodiment. The units of the radius of curvature and the thickness are millimeters (mm). Table 20 shows the high-order coefficients applicable to each aspheric surface in the seventh embodiment. The surface type of each aspheric surface may be defined by the formula (1) given in the first embodiment. Table 21 shows the total effective focal length f of the camera lens assembly in the seventh embodiment, the effective focal lengths f1-f5 of the lenses, the total track length TTL, and the half HFOV of the maximal field-of-view.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | −9.9384 | 0.5321 | 1.53 | 55.8 | 0.0000 |
| S2 | aspheric | 2.5737 | 0.7389 | | | 0.0000 |
| STO | spherical | infinite | 0.2171 | | | |
| S3 | aspheric | −395.3285 | 1.4573 | 1.62 | 23.5 | 0.0000 |
| S4 | aspheric | −2.4371 | 0.0501 | | | 0.0000 |
| S5 | aspheric | 4.1931 | 0.9518 | 1.53 | 55.8 | 0.0000 |
| S6 | aspheric | 6.6289 | 0.7731 | | | 0.0000 |
| S7 | aspheric | 7.3608 | 0.8933 | 1.62 | 23.5 | 0.0000 |
| S8 | aspheric | −5.3825 | 0.2490 | | | 0.0000 |
| S9 | aspheric | 2.2238 | 0.7093 | 1.53 | 55.8 | 0.0000 |
| S10 | aspheric | 2.9899 | 0.4751 | | | 0.0000 |
| S11 | spherical | infinite | 0.2100 | 1.52 | 64.2 | |
| S12 | spherical | infinite | 0.5231 | | | |
| S13 | spherical | infinite | | | | |

TABLE 20

| surface number | A4 | A6 | A8 | A10 | A12 | A14 | A16 |
|---|---|---|---|---|---|---|---|
| S1 | 1.1729E−01 | −8.0194E−02 | 4.7404E−02 | −2.0558E−02 | 5.6172E−03 | −8.4995E−04 | 5.3751E−05 |
| S2 | 1.9808E−01 | −1.3565E−01 | 1.9392E−01 | −1.8434E−01 | 1.1239E−01 | −3.5806E−02 | 4.5041E−03 |
| S3 | 6.2490E−04 | −2.7454E−02 | 3.7529E−02 | −2.9048E−02 | 8.1222E−03 | 2.4475E−04 | −3.1358E−04 |
| S4 | −5.1646E−03 | −1.6051E−04 | −3.8600E−04 | 3.2977E−05 | −6.4042E−04 | 2.8798E−04 | −4.3410E−05 |
| S5 | −8.3350E−03 | 6.2359E−03 | −1.3541E−03 | −3.5451E−05 | −7.0651E−06 | 9.1261E−06 | −7.9786E−07 |
| S6 | −6.5152E−03 | −1.7799E−02 | 1.4323E−02 | −5.1590E−03 | 9.2800E−04 | −8.4005E−05 | 3.1848E−06 |
| S7 | 4.6019E−02 | −3.9364E−02 | 1.7688E−02 | −5.5451E−03 | 1.0104E−03 | −8.5400E−05 | 1.8279E−06 |
| S8 | 9.4316E−02 | −1.0497E−01 | 6.3523E−02 | −2.3962E−02 | 5.4211E−03 | −6.6174E−04 | 3.3489E−05 |
| S9 | 8.2042E−02 | −1.2853E−01 | 6.6088E−02 | −3.1679E−02 | 1.0151E−02 | −1.6932E−03 | 1.1040E−04 |
| S10 | 1.2313E−01 | −9.9572E−02 | 2.3486E−02 | −2.0742E−03 | −5.9214E−05 | 1.7573E−05 | −4.6775E−07 |

TABLE 21

| | | | parameter | | | | |
|---|---|---|---|---|---|---|---|
| f (mm) | f1 (mm) | f2 (mm) | f3 (mm) | f4 (mm) | f5 (mm) | TTL (mm) | HFOV (°) |
| numerical value 1.92 | −3.82 | 3.94 | 19.05 | 5.15 | 12.46 | 7.78 | 61.1 |

Figure 14C:
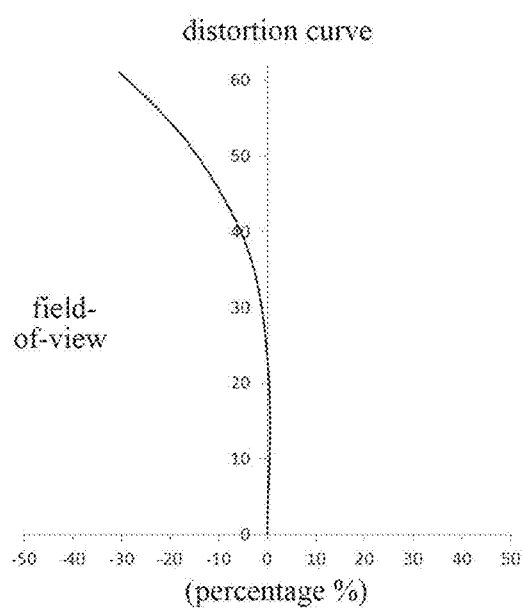
Figure 14D:
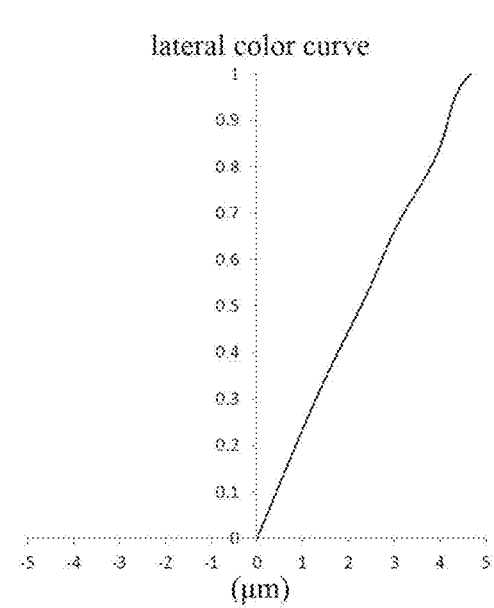

FIG. 14A illustrates the longitudinal aberration curve of the camera lens assembly according to the seventh embodiment, representing deviations of the focal points where lights of different wavelengths converge after passing through the lens assembly. FIG. 14B illustrates the astigmatic curve of the camera lens assembly according to the seventh embodiment, representing a curvature of the tangential image plane and a curvature of the sagittal image plane. FIG. 14C illustrates the distortion curve of the camera lens assembly according to the seventh embodiment, representing degrees of distortion at different viewing angles. FIG. 14D illustrates the lateral color curve of the camera lens assembly according to the seventh embodiment, representing deviations of different heights of images formed by lights passing through the lens assembly and located on the image plane. It can be seen from FIGS. 14A-14D that the camera lens assembly according to the seventh embodiment can achieve a good imaging quality.

To sum up, the first to seventh embodiments respectively satisfy the relationships shown in Table 22 below.

TABLE 22

| Conditional Expression | Embodiment | | | | | | |
|---|---|---|---|---|---|---|---|
| | 1 | 2 | 3 | 4 | 5 | 6 | 7 |
| f/EPD | 1.20 | 1.20 | 1.20 | 1.20 | 1.20 | 1.20 | 1.00 |
| DT11/EPD | 1.07 | 1.14 | 1.04 | 1.15 | 1.50 | 1.51 | 1.03 |
| tan(HFOV/2) | 0.57 | 0.56 | 0.55 | 0.54 | 0.56 | 0.78 | 0.59 |
| f1/f | −1.57 | −1.56 | −1.77 | −2.07 | −1.83 | −1.88 | −1.98 |
| f2345/f | 0.97 | 1.06 | 1.05 | 1.14 | 1.10 | 1.17 | 1.17 |
| f2/f | 1.83 | 1.48 | 1.48 | 2.67 | 2.82 | 2.27 | 2.05 |
| ΣT/TTL | 0.29 | 0.24 | 0.24 | 0.30 | 0.23 | 0.16 | 0.26 |
| CT2/ET2 | 2.99 | 3.02 | 2.28 | 3.03 | 1.90 | 3.00 | 2.48 |
| DT11/DT52 | 0.81 | 0.90 | 0.83 | 0.85 | 1.20 | 0.85 | 0.84 |
| SL/TTL | 0.84 | 0.83 | 0.82 | 0.81 | 0.76 | 0.85 | 0.84 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A camera lens assembly comprising, along an optical axis from an object side to an image side, a first lens, a second lens, a third lens, a fourth lens, and a fifth lens in sequence,
   wherein the first lens has a negative refractive power, and an image-side surface of the first lens is a concave surface;
   the second lens has a positive refractive power, and an image-side surface of the second lens is a convex surface;
   each of the third lens, the fourth lens, and the fifth lens has a positive refractive power or a negative refractive power; and
   a total effective focal length f of the camera lens assembly and an entrance pupil diameter EPD of the camera lens assembly satisfy: $0.8 < f/EPD < 1.6$,
   wherein the camera lens assembly has and only has five lenses having refractive power,
   wherein a half HFOV of a maximal field-of-view of the camera lens assembly satisfies: $\tan(HFOV/2) > 0.5$.

2. The camera lens assembly according to claim 1, wherein an effective focal length f2 of the second lens and the total effective focal length f of the camera lens assembly satisfy: $1.4 < f2/f < 3$.

3. The camera lens assembly according to claim 1, wherein a combined refractive power of the second lens, the third lens, the fourth lens, and the fifth lens is a positive refractive power, and a combined focal length f2345 of the second lens, the third lens, the fourth lens, and the fifth lens and the total effective focal length f of the camera lens assembly satisfy: $0.8 < f2345/f < 1.3$.

4. The camera lens assembly according to claim 1, wherein an effective semi-diameter DT11 of an object-side surface of the first lens and an effective semi-diameter DT52 of an image-side surface of the fifth lens satisfy: $0.7 < DT11/DT52 < 1.3$.

5. The camera lens assembly according to claim 1, wherein a center thickness CT2 of the second lens along the optical axis and an edge thickness ET2 of the second lens in a direction parallel to the optical axis satisfy: $1.8 < CT2/ET2 < 3.5$.

6. The camera lens assembly according to claim 1, wherein a sum ΣT of respective axial spacing distances between respective pairs of two adjacent ones of the first lens to the fifth lens and an axial distance TTL from the object-side surface of the first lens to an image plane of the camera lens assembly satisfy: $0.1<\Sigma T/TTL<0.3$.

7. The camera lens assembly according to claim 1, further comprising a diaphragm disposed between the first lens and the second lens.

8. The camera lens assembly according to claim 7, wherein an axial distance SL from the diaphragm to an image plane of the camera lens assembly and an axial distance TTL from the object-side surface of the first lens to the image plane of the camera lens assembly satisfy: $0.7<SL/TTL<1$.

9. A camera lens assembly, having a total effective focal length f, the camera lens assembly comprising, along an optical axis from an object side to an image side, a first lens, a second lens, a third lens, a fourth lens, and a fifth lens in sequence,
wherein the first lens has a negative refractive power; and
at least one of the second lens, the third lens, the fourth lens, or the fifth lens has a positive refractive power;
wherein an effective focal length f1 of the first lens satisfies: $-2.1<f1/f<-1.5$, and
a combined refractive power of the second lens, the third lens, the fourth lens, and the fifth lens is a positive refractive power,
wherein the camera lens assembly has and only has five lenses having refractive power,
wherein an effective semi-diameter DT11 of an object-side surface of the first lens and an effective semi-diameter DT52 of an image-side surface of the fifth lens satisfy: $0.7<DT11/DT52<1.3$.

10. The camera lens assembly according to claim 9, wherein the combined refractive power of the second lens, the third lens, the fourth lens, and the fifth lens is positive, and a combined focal length f2345 of the second lens, the third lens, the fourth lens, and the fifth lens and the total effective focal length f of the camera lens assembly satisfy: $0.8<f2345/f<1.3$.

11. The camera lens assembly according to claim 9, wherein a center thickness CT2 of the second lens along the optical axis and an edge thickness ET2 of the second lens in a direction parallel to the optical axis satisfy: $1.8<CT2/ET2<3.5$.

12. The camera lens assembly according to claim 9, wherein the total effective focal length f of the camera lens assembly and an entrance pupil diameter EPD of the camera lens assembly satisfy: $0.8<f/EPD<1.6$.

13. A camera lens assembly comprising, along an optical axis from an object side to an image side, a first lens, a second lens, a third lens, a fourth lens, and a fifth lens in sequence,
wherein the first lens has a negative refractive power, and at least one of an object-side surface of the first lens or an image-side surface of the first lens is a concave surface;
the second lens has a positive refractive power, and at least one of an object-side surface of the second lens or an image-side surface of the second lens is a convex surface;
each of the third lens and the fourth lens has a positive refractive power or a negative refractive power;
the fifth lens has a positive refractive power; and
an effective semi-diameter DT11 of the object-side surface of the first lens and an entrance pupil diameter EPD of the camera lens assembly satisfy: $1<DT11/EPD<1.6$,
wherein the camera lens assembly has and only has five lenses having refractive power.

14. The camera lens assembly according to claim 13, wherein the effective semi-diameter DT11 of the object-side surface of the first lens and an effective semi-diameter DT52 of an image-side surface of the fifth lens satisfy: $0.7<DT11/DT52<1.3$.

15. The camera lens assembly according to claim 13, wherein an effective focal length f2 of the second lens and the total effective focal length f of the camera lens assembly satisfy: $1.4<f2/f<3$.

16. The camera lens assembly according to claim 13, wherein a combined refractive power of the second lens, the third lens, the fourth lens, and the fifth lens is a positive refractive power, and a combined focal length f2345 of the second lens, the third lens, the fourth lens, and the fifth lens and the total effective focal length f of the camera lens assembly satisfy: $0.8<f2345/f<1.3$.

17. The camera lens assembly according to claim 13, wherein a center thickness CT2 of the second lens along the optical axis and an edge thickness ET2 of the second lens in a direction parallel to the optical axis satisfy: $1.8<CT2/ET2<3.5$.

18. The camera lens assembly according to claim 13, wherein a sum $\Sigma T$ of respective axial spacing distances between respective pairs of two adjacent ones of the first lens to the fifth lens and an axial distance TTL from the object-side surface of the first lens to the image plane of the camera lens assembly satisfy: $0.1<\Sigma T/TTL\leq0.3$.

19. The camera lens assembly according to claim 13, wherein a half HFOV of a maximal field-of-view of the camera lens assembly satisfies: $\tan(HFOV/2)>0.5$.

* * * * *